US012529710B2

United States Patent
Carlson et al.

(10) Patent No.: US 12,529,710 B2
(45) Date of Patent: Jan. 20, 2026

(54) GYROSCOPE AND OPTICAL FLOW SENSOR SCALE CALIBRATION

(71) Applicant: CEVA TECHNOLOGIES, INC., Mountain View, CA (US)

(72) Inventors: Douglas Charles Carlson, Mountain View, CA (US); Bryan A. Cook, Silver Spring, MD (US); Zhanlue Zhao, Mountain View, CA (US); Yun Li, Mountain View, CA (US)

(73) Assignee: CEVA TECHNOLOGIES, INC., Mountain View, CA (US)

( * ) Notice: Subject to any disclaimer, the term of this patent is extended or adjusted under 35 U.S.C. 154(b) by 576 days.

(21) Appl. No.: 17/618,997

(22) PCT Filed: Jun. 25, 2020

(86) PCT No.: PCT/US2020/039513
§ 371 (c)(1),
(2) Date: Dec. 14, 2021

(87) PCT Pub. No.: WO2020/264089
PCT Pub. Date: Dec. 30, 2020

(65) Prior Publication Data
US 2022/0299543 A1    Sep. 22, 2022

Related U.S. Application Data

(60) Provisional application No. 62/868,591, filed on Jun. 28, 2019.

(51) Int. Cl.
*G01P 21/00* (2006.01)
*G01C 19/54* (2006.01)
(Continued)

(52) U.S. Cl.
CPC .............. *G01P 21/00* (2013.01); *G01C 19/54* (2013.01); *G01C 25/005* (2013.01); *G01P 3/806* (2013.01); *G01P 15/14* (2013.01)

(58) Field of Classification Search
CPC .......... G01P 21/00; G01P 3/806; G01P 15/14; G01C 19/54; G01C 25/005;
(Continued)

(56) References Cited

U.S. PATENT DOCUMENTS

| 8,073,564 | B2 | 12/2011 | Bruemmer et al. | |
| 8,692,896 | B2 * | 4/2014 | Masuda | H04N 23/80 |
| | | | | 348/208.99 |

(Continued)

FOREIGN PATENT DOCUMENTS

| JP | 2016076248 A | 5/2016 |
| JP | 6262865 B2 | 1/2018 |

(Continued)

OTHER PUBLICATIONS

International Search Report/Written Opinion dated Nov. 6, 2020 in related/corresponding PCT Application No. PCT/US2020/039513.
(Continued)

*Primary Examiner* — Lina Cordero
*Assistant Examiner* — Lyudmila Zaykova-Feldman
(74) *Attorney, Agent, or Firm* — PATENT PORTFOLIO BUILDERS PLLC

(57) ABSTRACT

A method for calculating a scale factor for a gyroscope can include detecting, by a gyroscope, a physical motion of a robot, detecting, by an optical flow (OF) sensor (and/or camera), one or more image signals including information; and deriving estimates of sensor calibration parameters based on the detected physical motion and the information.

18 Claims, 16 Drawing Sheets

(51) Int. Cl.
*G01C 25/00* (2006.01)
*G01P 3/80* (2006.01)
*G01P 15/14* (2013.01)

(58) Field of Classification Search
CPC ...... G01C 21/1656; G05B 2219/37009; G05B 2219/45098; B25J 9/1653; B25J 9/1692
See application file for complete search history.

(56) References Cited

U.S. PATENT DOCUMENTS

| | | | |
|---|---|---|---|
| 9,152,915 | B1 | 10/2015 | Gabardos et al. |
| 10,254,118 | B2 | 4/2019 | Roumeliotis et al. |
| 11,481,918 | B1* | 10/2022 | Ebrahimi Afrouzi ........................ A47L 11/4008 |
| 2008/0249732 | A1* | 10/2008 | Lee ...................... G01C 25/005 702/96 |
| 2011/0206236 | A1* | 8/2011 | Center, Jr. .............. G06T 7/593 382/103 |
| 2012/0203487 | A1* | 8/2012 | Johnson ............... G01C 25/005 702/141 |
| 2014/0104445 | A1 | 4/2014 | Ramachandran et al. |
| 2015/0114082 | A1* | 4/2015 | Blanchard ............ G01C 25/005 73/1.77 |
| 2015/0248585 | A1* | 9/2015 | Takeuchi ................ H04N 23/71 382/103 |
| 2015/0293138 | A1* | 10/2015 | Briod ....................... G05D 1/00 702/142 |
| 2016/0005164 | A1* | 1/2016 | Roumeliotis ...... G01C 21/1652 901/1 |
| 2017/0153122 | A1 | 6/2017 | Tang et al. |
| 2017/0239821 | A1* | 8/2017 | Lessing .................... B25J 15/12 |
| 2018/0075609 | A1 | 3/2018 | He |
| 2018/0364048 | A1 | 12/2018 | Cook et al. |
| 2018/0364731 | A1* | 12/2018 | Liu ........................... G06T 7/50 |
| 2019/0049962 | A1* | 2/2019 | Ouellette ............. G05D 1/0094 |
| 2019/0121364 | A1* | 4/2019 | Tsai ..................... G05D 1/0246 |
| 2020/0192388 | A1* | 6/2020 | Zhang .................. G05D 1/0246 |
| 2020/0209954 | A1* | 7/2020 | Parsley ................. G06T 19/006 |
| 2022/0011110 | A1* | 1/2022 | Youssef .................. G01C 19/14 |
| 2022/0299321 | A1 | 9/2022 | Zhao et al. |
| 2024/0142994 | A1* | 5/2024 | Ebrahimi Afrouzi .. G06V 20/58 |

FOREIGN PATENT DOCUMENTS

| | | | | |
|---|---|---|---|---|
| JP | 2019020289 | A | 2/2019 | |
| KR | 1020080090215 | A | 10/2008 | |
| WO | WO-2016187757 | A1 * | 12/2016 | ........... B64C 39/024 |
| WO | 2018129335 | A1 | 7/2018 | |

OTHER PUBLICATIONS

International Search Report/Written Opinion dated Sep. 30, 2020 in related/corresponding PCT Application No. PCT/US2020/039856.
Extended European Search Report dated Jul. 10, 2023 in corresponding/related European Application No. 20833217.1.
Extended European Search Report dated Jul. 7, 2023 in corresponding/related European Application No. 20830725.6.
Javier Diaz et al., "FPGA-Based Real-Time Optical-Flow System," Transaction Letters, IEEE Transactions On Circuits and Systems for Video Technology, Feb. 2006, vol. 16, No. 2, pp. 274-279.
Volker Grabe et al., "A comparison of scale estimation schemes for a quadrotor UAV based on optical flow and IMU measurements," IEEE/RSJ International Conference on Intelligent Robots and Systems (IROS), Tokyo, Japan, Nov. 3-7, 2013, pp. 5193-5200.
HowStuffWorks, article entitled "How Robotic Vacuums Work," Nov. 3, 2005, by Julia Layton, retrieved Nov. 28, 2023 from Internet: https://electronics.howstuffworks.com/gadgets/home/robotic-vacuum.htm.
Mehrdad Negahban and the University of Nebraska, 1996-2002, "Relative motion of points on a rigid body," http://emweb.unl.edu/NEGAH BAN/EM373/note15/note.htm, 2 pages.
Mingxiao He et al., "Enhanced Positioning Systems Using Optical Mouse Sensors," 2014, Springer International Publishing, Switzerland, pp. 463-474.
Paramvir Bahl et al., "RADAR: An In-Building RF-based User Location and Tracking System," 2000, IEEE INFOCOM. IEEE Computer and Communications Societies, pp. 775-784.
Ronald P.M. Chan et al., "Characterisation of Low-cost Optical Flow Sensors," 2010, 9 pages.
Thomas R. Kane et al., "Dynamics: Theory and Applications," 1985, pp. 1-402, New York, McGraw-Hill Book Company.
Wikipedia, The Free Encyclopedia, post entitled "Angular velocity," 6 pages, date of last revision Dec. 20, 2023 by Wikipedia contributors, retrieved Dec. 20, 2023 from Internet: https://en.wikipedia.org/wiki/Angular velocity.
Wikipedia, The Free Encyclopedia, post entitled "Pitch detection algorithm," 4 pages, date of last revision Sep. 22, 2022 by Wikipedia contributors, retrieved Nov. 28, 2023 from Internet: https://en.wikipedia.org/wiki/Pitchdetection algorithm.
Zhanlue Zhao et al., "Camera and IMU Frame Alignment in AR/VR Systems for Different Gyroscope Specifications," 4th International Conference on Sensors Engineering and Electronics Instrumentation Advances (SEIA' 2018), Sep. 19-21, 2018, Amsterdam, The Netherlands, 6 pages.
Office Action dated Apr. 22, 2024 in corresponding/related Japanese Application No. 2021-577607.
Office Action dated Apr. 22, 2024 in corresponding/related Japanese Application No. 2021-577621.
Decision to Grant dated Oct. 15, 2024 in corresponding/related Japanese Application No. 2021-577621.
Decision to Grant dated Oct. 21, 2024 in corresponding/related Japanese Application No. 2021-577607.
Office Action dated May 6, 2025 in corresponding/related European Application No. 20833217.1.
Office Action dated Jul. 29, 2025 in corresponding/related Korean Application No. 10-2022-7003349.

* cited by examiner

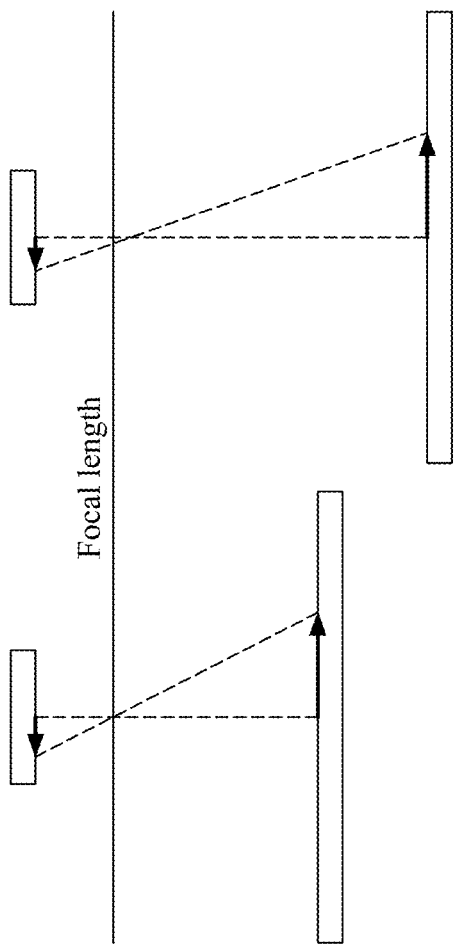
FIG. 2
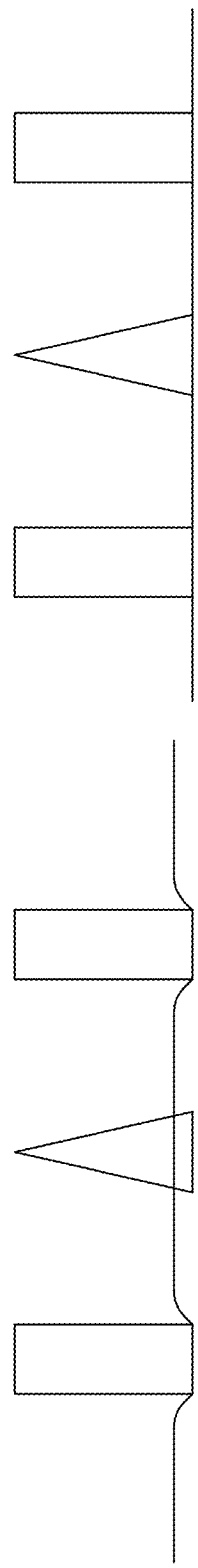
FIG. 3A
FIG. 3B

GYROSCOPE AND OPTICAL FLOW SENSOR SCALE CALIBRATION

RELATED APPLICATION

This application is a National Stage of PCT/US2020/039513, filed on Jun. 25, 2020, which is related to, and claims priority from, U.S. Provisional Patent Application No. 62/868,591, entitled "Methods and Apparatus for Mutual Gyroscope Scale and Optical Flow Sensor Scale Calibration Through Optical Flow Image Quality Metadata", filed on Jun. 28, 2019, the disclosure of which is incorporated here by reference.

BACKGROUND

It is becoming increasingly popular and widespread for electronic devices, especially mobile devices, such as cellular telephones, digital cameras, global positioning system (GPS) units, laptop and palmtop computers, automobiles, robotic vacuum cleaners, to include sensors (e.g., motion sensors) to provide enhanced functionality. For example, the sensors may include a gyroscope that measures angular velocities, an accelerometer that measures linear acceleration, and/or an optical flow (OF) sensor that measures the displacement of image features over time.

Many applications in surface robotics require high-quality odometry measurements to perform well. In some examples, a typical robot platform may include one or more, or any combination(s) of the following sensed qualities: 1) inertial measurements (e.g., gyroscopes for measuring angular velocity, and/or accelerometers for measuring linear acceleration); 2) linear motion estimates with respect to the ground (e.g., wheel encoders transduce wheel rotation to linear distance, and/or optical flow (OF) sensors reporting the apparent motion of visible points on the ground surface); 3) Distance estimates with respect to obstructions in the environment (e.g., light detection and ranging (LIDAR), infrared proximity, ultrasound); and/or 4) contact detections with obstructions in the environment (e.g., bumper switches).

A Robot system such as a consumer robot (e.g., a planar robot, a robotic vacuum cleaner or RVC) may include one or more inertial measurement units (IMUs) (or IMU sensors) and one or more OF sensors for navigation and simultaneous localization and mapping (SLAM). The IMU, which may contain one or more accelerometer(s) and gyroscope(s) (e.g., a MEMS gyroscope), provides linear acceleration and angular velocity measurements which can be used to obtain orientation (heading) relative to some initial orientation. The OF sensor provides linear velocity measurements of the sensor with respect to the ground surface. In some examples, an OF sensor may measure the displacement of image features over time. For example, an OF sensor may report a two-dimensional (2-D) displacement vector every time that it is sampled, representing the average number of feature pixels moved between consecutive sample images. In some cases, the OF sensor may measure displacement in the X-axis and Y-axis between two sampling points.

Consumer robots may obtain a heading estimate through integration of a scaled gyroscope measurement. A gyroscope scale may change over the lifetime of a part, for example, due to aging effects. An OF sensor may provide image quality data (as well as linear motion relative to the surface).

For a robot system, it is essential to obtain sensor calibration parameters and calibrate sensors, because accurate calibration is the key to achieve high-accuracy operations for the robot system.

SUMMARY

According to an embodiment, a method for scale calibration includes detecting, by a gyroscope, a physical motion of a robot; detecting, by an optical flow (OF) sensor (and/or camera), one or more image signals including information; and derive estimates of sensor calibration parameters based on the detected physical motion and the information.

According to another embodiment, a system for scale calibration includes a gyroscope configured to detect a physical motion of a robot; an optical flow (OF) sensor and/or camera configured to generate one or more image signals including information; and a processor configured to derive estimates of sensor calibration parameters based on the detected physical motion and the information.

According to an embodiment, a method for calibrating a gyroscope disposed on a robot includes placing the robot on a calibration surface, rotating the robot on the calibration surface, determining a first heading of the robot using a gyroscope, determining a second heading of the robot using an image sensor; and calibrating the gyroscope based on the first heading and the second heading.

According to an embodiment, a system for calibrating a gyroscope disposed on a robot includes a calibration surface, a robot disposed on the calibration surface, a gyroscope disposed on the robot, an image sensor disposed on the robot and a processor for generating a first heading of the robot using data generated by the gyroscope and a second heading of the robot using data generated by the image sensor and further configured to generate a calibration parameter for the gyroscope using the first heading and the second heading.

According to an embodiment, a method for calibrating a gyroscope disposed on a robot includes docking the robot at a docking station wherein the robot has a first heading based on information from the gyroscope, departing, by the robot, from the docking station rotating the robot, docking the robot at the docking station again, wherein the robot has a second heading based on information from the gyroscope; and calibrating the gyroscope based on a difference between the first heading and the second heading.

BRIEF DESCRIPTION OF THE DRAWINGS

A more detailed understanding may be had from the detailed description below, given by way of example in conjunction with drawings appended hereto. Figures in description, are examples. As such, the Figures and the detailed description are not to be considered limiting, and other equally effective examples are possible and likely. Furthermore, like reference numerals in the figures indicate like elements, and wherein:

FIG. 2 is a graph illustrating an example of an optical flow scale sensitivity, in accordance with one or more embodiments;

FIG. 3A is a graph illustrating an example of an optical flow sensor operating on a soft surface, in accordance with one or more embodiments;

FIG. 3B is a graph illustrating an example of an optical flow sensor operating on a hard surface, in accordance with one or more embodiments;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

As noted above, a robot system, such as a robot vacuum cleaner, may have an IMU that includes one or more accelerometers and/or gyroscopes, to provide heading information for use in controlling the robot. The robot also may include or incorporate other sensors, such as an OF sensor that measures the displacement of image features over time. The planar robot system may also have a controller, such as a processor, that has access to the data from all the sensors, and therefore, can calculate the robot's motion, as well as positional, and/or orientational status. For example, if both the wheel encoder and the camera show no motion, and all the motors are idle, the controller may reasonably assume that the robot is stationary.

In addition, the robot may include motors for causing the robot to move in any number of ways, including rotation about any axis and/or translation in any direction, and/or including rotation and translation of parts of the robot relative to other parts of the robot (e.g., mechanical arms that move relative to the main body of the robot). The controller also may be adapted to direct the motion of the robot by controlling the motors.

In various embodiments, the OF sensor and IMU may be on a same robot, so their angular velocity generally should be the same, and their kinematic parameters may be related, such that it may be possible to calibrate one using the other. For example, the OF sensor and IMU may be on the same rigid body (e.g., a planar robot system) and the kinematic quantities (e.g. velocity) of the OF sensor and IMU may be related by rigid body equations. In an example, the controller (or other processing device) of the robot may use data from the IMU or IMU sensor(s) and/or the other sensors and components (e.g., cameras, wheel encoders) to improve the calibration of the OF sensor. In another example, the controller (or other processing device) may use data from the OF sensor to calibrate the IMU (e.g., gyro scale of the IMU) in a robot system. For example, if the OF sensor accuracy is good enough, the OF sensor may be used to calibrate gyroscope scale of the robot system.

Description of a Sensor System

Figure 1:
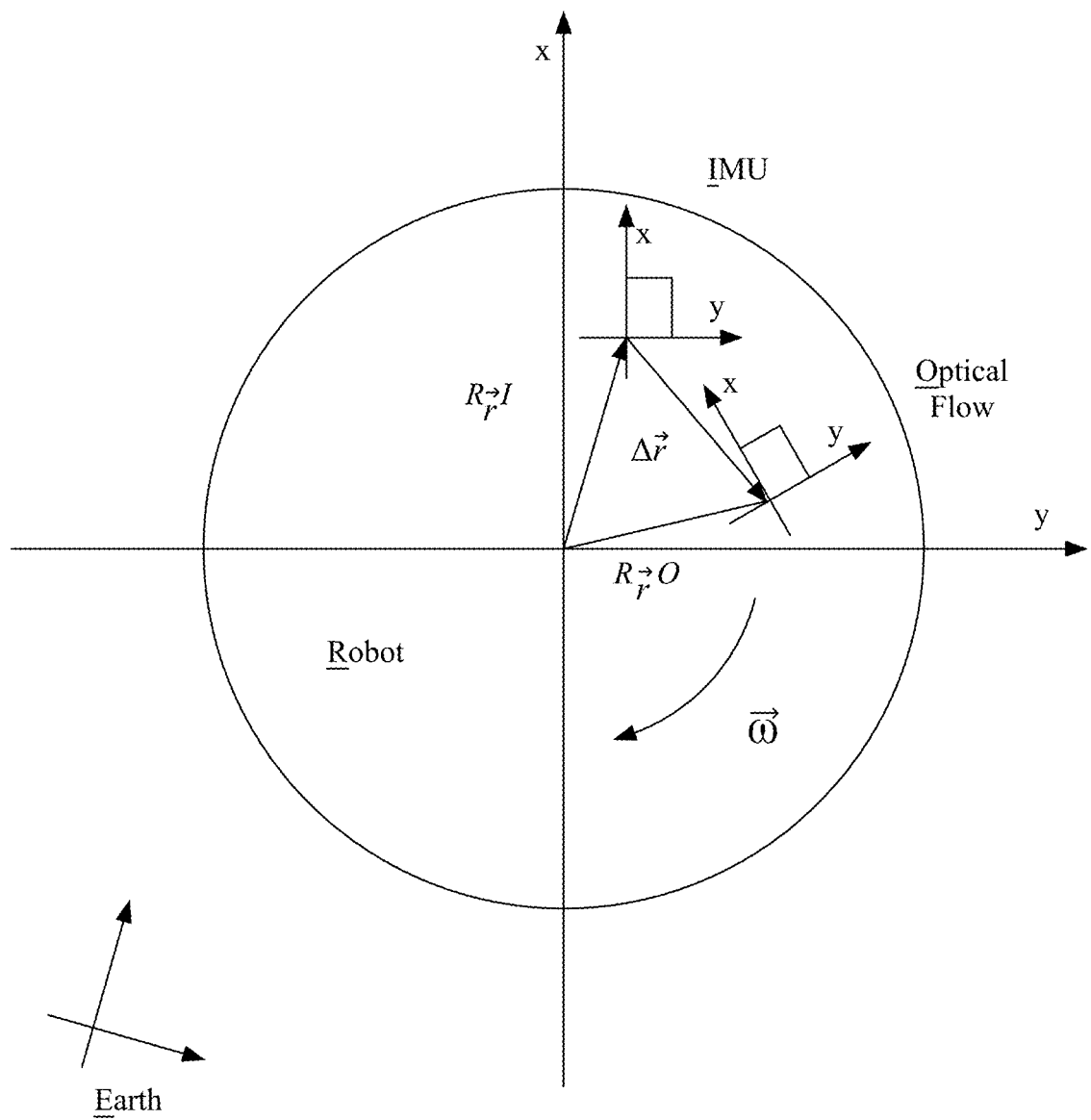
FIG. 1 is a physical layout of sensors in an exemplary robot system having symbol references, in accordance with one or more embodiments.

FIG. 1 is an exemplary diagram for a physical layout of sensors in a robot system. The diagram in FIG. 1 summarizes the notation used to relate the various quantities and reference frames to each other.

The notation $^B\vec{v}^A$ designates a vector $\vec{v}$ as measured in frame of reference B at a point A. The Robot frame is designated with R. The rotation of a vector from R to the IMU (I) and optical flow (O) frames is represented by the Direction Cosine Matrices $R_{R \to I}$ and $R_{R \to O}$, respectively, for example:

$$\vec{v}^I = R_{R \to I} {}^R\vec{v}^I, {}^O\vec{v}^O = R_{R \to O} {}^R\vec{v}^O$$

Let us define the robot Z axis as perpendicular to the ground surface upon which it drives. In some cases, the optical flow sensor Z axis may also need to be perpendicular to the ground for correct sensor operation. The displacement of the IMU and optical flow sensors relative to the robot center are represented by $^R\vec{r}^I$, $^R\vec{r}^O$, respectively.

Under rigid body assumptions, the angular velocity in the global frame is identical at all points in this structure. For the common case where motion is constrained to the X-Y plane, it is noted that the angular velocity $\vec{\omega}$ may have negligible x and/or y components, i.e., $\vec{\omega}=[0, 0, \omega]$ and the property that $^R\vec{\omega}_R=^R\vec{\omega}_I=^R\vec{\omega}_O=\vec{\omega}$ may be independent of the reference frame if the Z axes for these frames are all aligned (e.g., with the Earth-frame Z axis). For simplicity, ω denotes both the angular velocity vector $\vec{\omega}$ or the angular speed ω, which can be inferred from the context. In some examples, quantities may be represented in absolute Earth-frame terms. In some examples, quantities (e.g., concerned with measuring) are insensitive to linear position in a global coordinate frame or an initial orientation.

Gyroscope Error Sources

In various embodiments, in the case of planar motion, the true angular velocity ω may be related to a gyroscope measurement x through the following relationship:

$$\omega \approx \alpha x - \omega_{zro}(k)$$

where $\omega_{zro}(k)$ is the Zero-Rate Offset (ZRO) at temperature k, and is the perceived angular velocity reported for a device at rest. More specifically, gyroscopes (e.g., MEMs gyroscopes) typically report a non-zero angular velocity (ZRO, which is an error) when they are at rest, and ZRO typically changes as a function of a sensor temperature.

In general, 3-axis gyroscope measurements require calibration of scale, cross-axis skew, and rotation parameters to accurately relate the sensor output to physical motion. Under the assumption that the motion is planar, only a single axis (Z) has meaningful data and these calibration terms can be absorbed into a single scale value α. In fact, many consumer surface robots use a single-axis gyroscope for reasons of lower cost or improved accuracy.

In various embodiments, while $\omega_{zro}(k)$ may be measured, characterized, and/or corrected, there are several other error sources that also need to be considered. For example, one of the error sources is the sensor aging effect. More particularly, the accumulation of mechanical stresses through heating/cooling cycles may cause the gyroscope scale to change over time. In some cases, MEMs gyroscopes with current commercial grade have typical aging effects of around 1%.

Sensor non-linearity errors is another error source that may be introduced when the assumption that gyroscope measurements are linearly related to angular velocity fails to hold. Non-linearity commonly has a minor effect for current commercial MEMs gyroscopes, and a simple linear scale may be sufficient for practical purposes.

Sensitivity to linear acceleration is another general concern for MEMs gyroscopes (e.g., linear acceleration causing a change in the bias of the angular velocity output). However, for the case of planar motion, the largest practical contributor of linear acceleration is gravity and the orientation relative to gravity under normal circumstances does not change in most planar motion scenarios, also current commercial MEMs gyroscopes have relatively small linear acceleration effects. Accordingly, sensitivity to linear acceleration may not cause significant error in the gyroscope readings.

For these reasons, the various embodiments discussed herein will focus on combating aging-induced scale changes in field-deployed robots (as opposed to other sources of error). In some cases, for simplicity, the equations assume that ZRO has been measured and removed from the gyroscope measurements, and some range of nominal scales is known (e.g., manufacturer-provided average, minimum and/or maximum scale value across parts).

Optical Flow Scale Sensitivity

An optical flow sensor operates by detecting the apparent motion of surface features projected onto an image detector. An image detector or sensor chip can be connected to a processor running an optical flow algorithm to output measurements associated with detected visual motion of, e.g., a robot upon which the image sensor chip is mounted. FIG. 2 shows graphically how the distance between the image sensor (top) and the sensed surface (bottom) influences the observed motion of a single tracked point for a sensor with a fixed focal length.

While an optical flow sensor is typically installed at some nominal height (e.g., to keep the tracked surface in focus with a fixed lens), a different effective surface height may be experienced when moving between hard surfaces and soft surfaces, or when the suspension of the robot changes (e.g., due to changes in cargo weight). Referring to FIG. 3A and FIG. 3B, the gray rectangles represent an edge-on view of the robot's wheels, and the triangle shows the nominal viewing range of the optical flow sensor. FIG. 3A and FIG. 3B, show how the viewing range might change for an OF sensor between a soft surface (e.g., a carpet) and a hard surface (e.g., a tile), respectively.

Relevant Approaches

A spatially-varying signal may be used to perform localization or sensor calibration. A robot system may use OF image quality data to calibrate an IMU. Localization of a device via correlation with previously-measured RF or magnetic "fingerprints" has been well-known in the literature for decades. Rather than attempting to localize a sensor by identifying similar signal characteristics to those observed previously, new or enhanced approaches focus on exploiting known spatial characteristics of a signal. In some examples, there is an advantage of constrained motion (e.g., rotation on a planar surface) to relate the signal to a specific trajectory, which may be not practical for the case of free motion in space.

In some current implementations, calibrating gyroscope scale via magnetometer measurements is used. In this approach, the fundamental assumption is the repeatability of the horizontal components of the uncalibrated earth magnetic field, when the device revisits the same heading multiple times (e.g., when it is rotated 360°). The underlying magnetic field being used to execute this method may not be stable enough in practice to yield good performance for surface-bound robot motion. The influence of construction materials (e.g., wiring, metal reinforcements) and the robot itself (e.g., spinning motors) may generate a magnetic environment which either changes over time or displacement enough to limit this approach's efficacy.

Gyroscope Scale Estimation Through Surface Image Quality Measurements

In some examples, standard optical flow sensors may output not just a change in position over time, but also a variety of image quality metrics. These are typically used to adjust illumination sources or to provide a rough measure of how much the position output can be trusted. The values reported may include one or more of: minimum pixel intensity, maximum pixel intensity, average pixel intensity, "surface quality" (typically a proxy for the number of trackable points in view), and/or image sensor gain.

These image quality signals vary as the optical flow sensor is moved over a surface. If the relationship between location and image quality is known, it can be exploited to estimate a connected gyroscope's motion. Having an estimate for the true motion of the gyroscope allows one to calibrate it. For the case of circular motion, the robot system may estimate gyroscope scale by detecting either the frequency of a pattern that repeats in the spatial domain, the period of a pattern that repeats once for every revolution of the device, or the position of discrete reference marks. The estimation of gyroscope scale will be described in greater detail below.

An exemplary embodiment of the approach disclosed above is to have a wheeled robot rotate in place while capturing the OF sensors image quality output and the gyroscope's angular velocity output, and then combining/comparing this data to characterize the gyroscope behavior.

Pattern Frequency Detection on An Engineered Surface

Figures 4, 5:
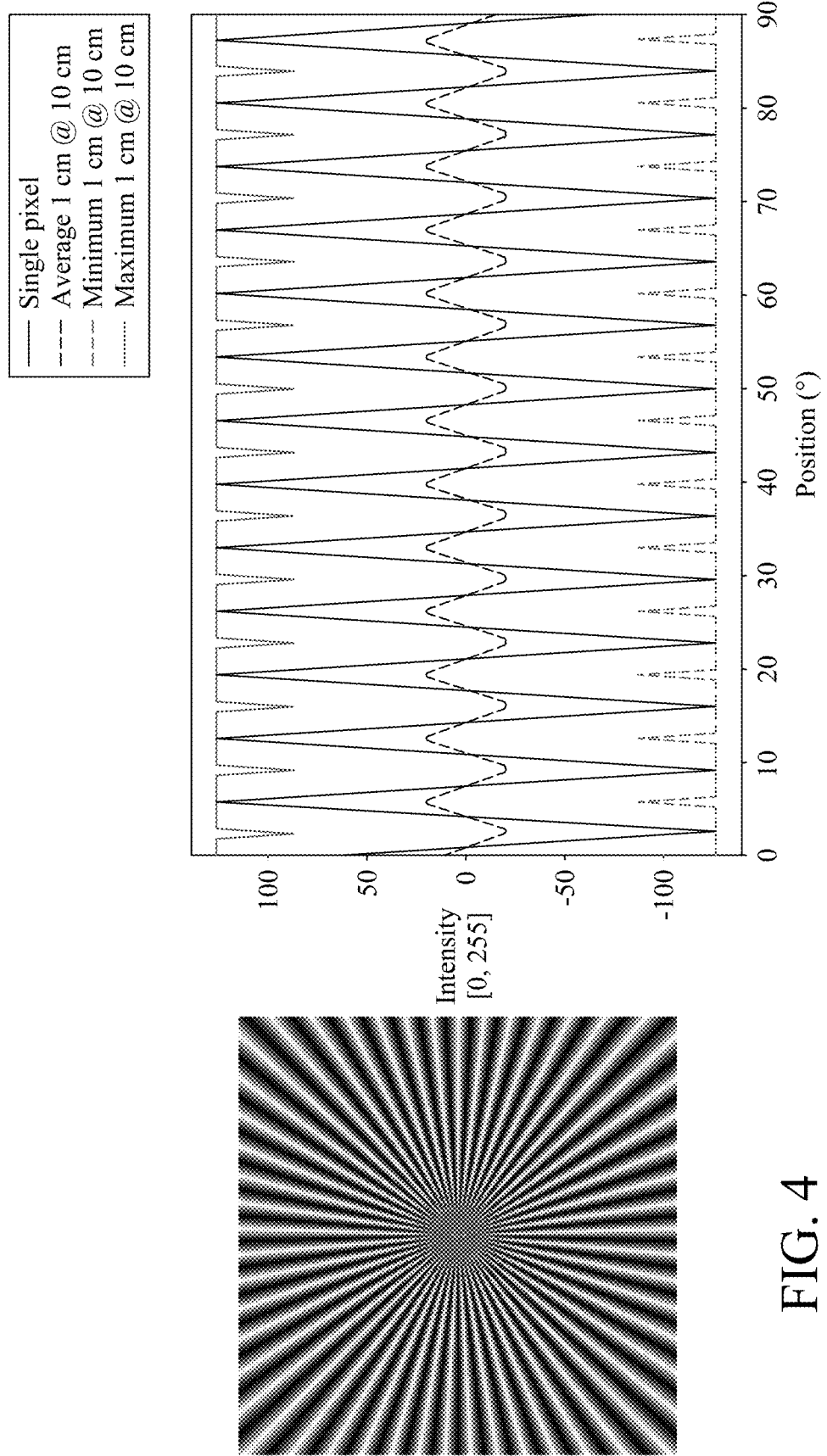
FIG. 4 is a graph illustrating an example of a surface period calibration pattern, in accordance with one or more embodiments.
FIG. 5 is a graph illustrating an example of different intensities for a motion at a center pixel and over a typical field of view, in accordance with one or more embodiments.

In one embodiment, if the device of the robot system can be caused (or configured) to rotate on top of an engineered calibration surface (e.g., with fiducial markers detectable by the OF sensor), the robot system may use the observed correspondence between the gyroscope-derived heading (integrated gyroscope output) and the expected signal characteristics associated with the calibration surface for calibration. FIG. 4 shows one such engineered calibration surface where the brightness of a point corresponds to the detected intensity of that point when it is in view of the optical flow sensor. In FIG. 4, for example, there are 53 bands radiating from the center. When an OF sensor moves through a circle centered on this pattern, the intensity of the OF sensors center pixel is dictated by its angular position relative to the pattern. For a robot rotating in place with its center of rotation (CoR) in the middle of the pattern, the observed intensity for an OF sensor at any non-zero radius will exhibit a triangular pattern in the spatial domain with a frequency of 53 cycles per 360°. This holds because the intensity is constant along each line radiating outwardly from the center. The average intensity over the field of view for the OF sensor may be a smoothed version of this. The ideal intensity versus position function is shown in FIG. 5 for this pattern as well as several typical image quality metrics (e.g., minimum pixel intensity, maximum pixel intensity, average pixel intensity over its field of view) reported by an exemplary OF sensor.

In various embodiments, using the average intensity of the sensed surface produces a signal which is well-suited to various pitch detection algorithms. The approaches described herein are not limited to a specific image quality metric or a pitch-detection method. In some examples, instead of using "average intensity over field of view" and/or Discrete Fourier Transform (DFT) techniques, another pitch detection technique or image quality metric may be used to achieve same or similar results.

Figure 6:
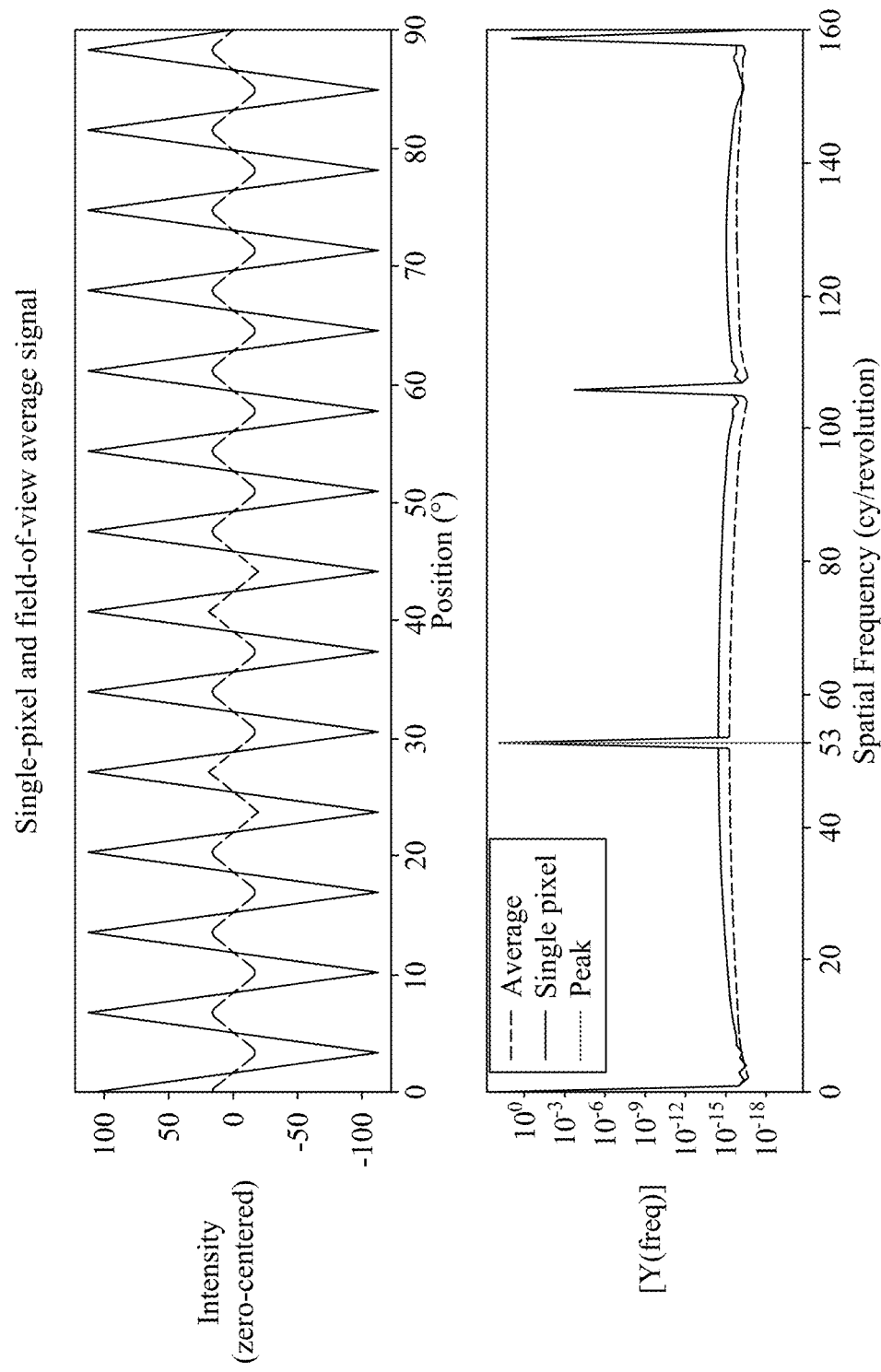
FIG. 6 includes graphs illustrating an example of peak signal frequencies preserved over a field of view average, in accordance with one or more embodiments.

In an example, FIG. 6 demonstrates the relationship between the original signal at a single pixel and the average pixel value in a 1 cm square window moving over the surface with a 10 cm radius in the spatial domain (top), and a subset of the DFT output of the same signals with peak frequency indicated in the frequency domain (bottom). If the gyroscope and OF sensor are both mounted on a rigid body, and the rigid body is moving in a circle about the pattern center, then integrating the gyroscope output signal will yield the heading of the OF sensor with respect to the pattern modulo a fixed angular offset (e.g., between the gyroscope and the OF sensor) and an unknown initial heading. This analysis does not rely on knowing the initial orientation or true displacement between the involved sensors, or between the sensors and the center of rotation. In one embodiment, the robot system may perform a DFT on the image quality signal to obtain the dominant frequency of the image quality signal relative to the gyroscope angular position in the domain of the gyroscope-derived heading. Note that this computation is insensitive to the initial heading. The robot system may then calculate therefrom a scale value that causes the gyroscope-derived heading to correspond exactly to the (e.g., known) true pattern frequency obtained from the OF sensor. For example, if the DFT yields a result that the dominant frequency of the OF output corresponding to 360° of rotation as measured by the gyroscope is 52, instead of the expected 53, then scaling the gyroscope output by $53/52$ (or 1.10923) will yield an accurate overall heading that does not accumulate error with angular distance traveled.

Figure 7:
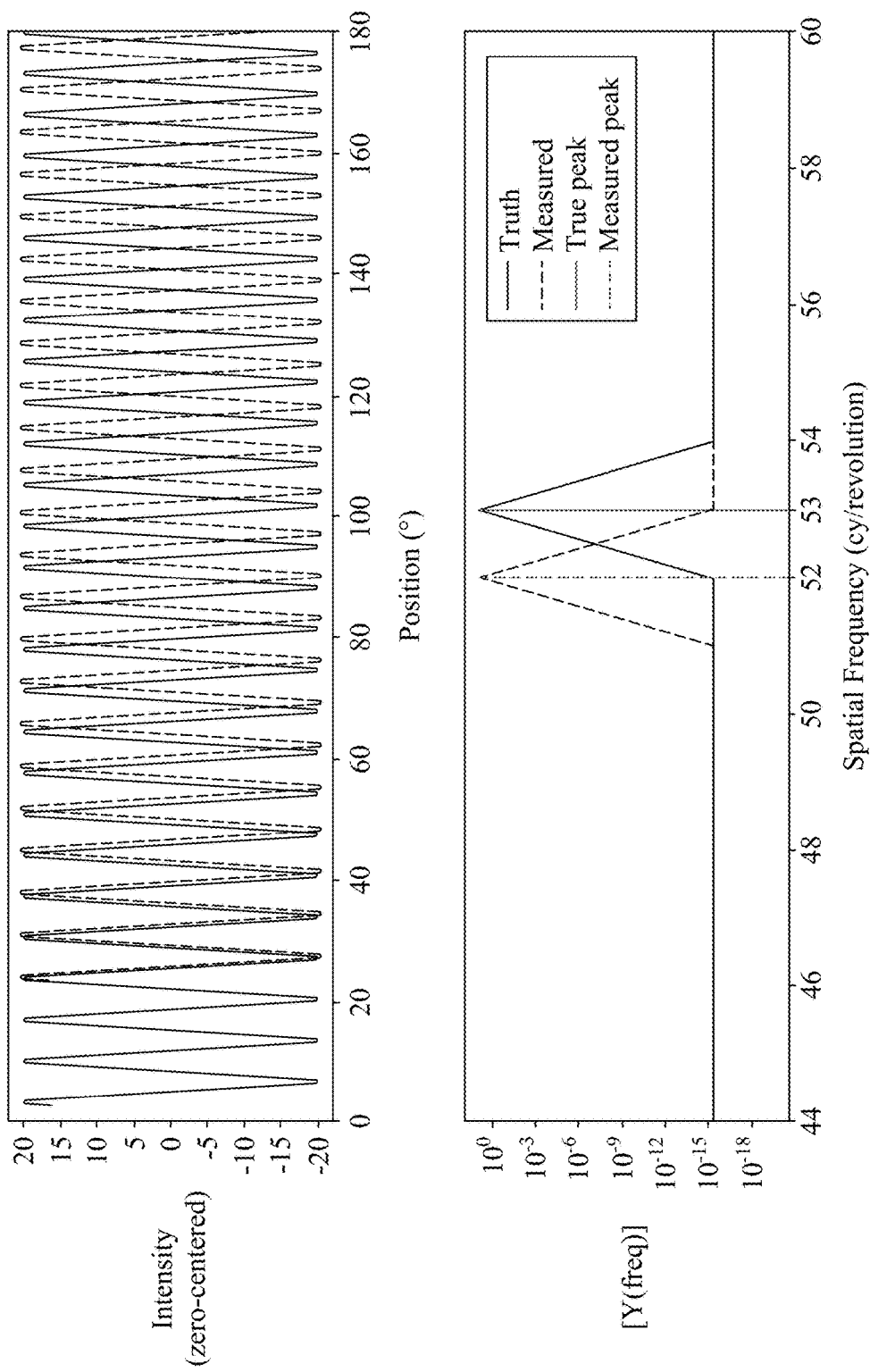
FIG. 7 includes graphs illustrating an example of an effect of gyroscope scale error on a measured signal and a peak frequency, in accordance with one or more embodiments.

FIG. 6 shows the position-domain and frequency-domain OF intensity metadata output when moving over the pattern shown in FIG. 4. Therein the angular position detected using the gyroscope is the true angular position in this case. The peak at 53 cy/revolution indicates that 53 peaks are counted every time the OF sensor makes a revolution. FIG. 7 repeats the measurement of the pattern of FIG. 4 and generates similar intensity metadata output as in FIG. 6, but adds a series where the angular position is not the ground truth angular position, instead the angular position obtained from the gyroscope has a scale error. This results in a peak at 52 cycles/revolution. Since the expected cy/rev is known a priori (53), the system can determine that the discrepancy is due to a gyroscope scale error.

More specifically, the upper graph in FIG. 7 illustrates the relationship between the unscaled gyroscope signal (dashed line) and the actual heading relative to the surface pattern/OF signal (e.g., as measured with scale error versus true heading). The lower graph in FIG. 7 shows the DFT output before scale correction (dashed line, as measured with scale error) and after scale correction (solid line, true heading).

In some cases, this approach may have some associated pre-conditions. For example, Optical flow sensor must rotate about the center of the surface pattern.
- The center of rotation and center of the surface pattern must be at the same point. Otherwise, the frequency of the surface pattern will vary with respect to position.
- For wheeled robots, the robot must begin its rotation about a known point (with arbitrary initial heading), and/or
- For wheeled robots, the robot must maintain a circular motion throughout its rotation.

Surface pattern must generate known signal characteristics.
- Range of values does not necessarily need to be known, but frequency of variation in the spatial domain does need to be known a priori;
- Surface must be designed to provide meaningful variation in the characteristics that an optical flow sensor can measure (e.g. surface reflectivity);
- If the optical flow sensor uses automatic gain control which influences the output signal, it should be compensated for to obtain best results.

Gyroscope measurements must be able to produce a stable heading estimate when integrated over the course of the test motion
- Scale must be constant for the duration of the test.
- Gyroscope output offset introduced by temperature (e.g., ZRO) can be reliably removed from the signal prior to integration The choice of pitch-detection method may have some inherent limitations
- The frequency resolution of a DFT, for example, scales with the inverse of the data duration and may require long measurements to obtain results having the necessary precision.

Figure 8:
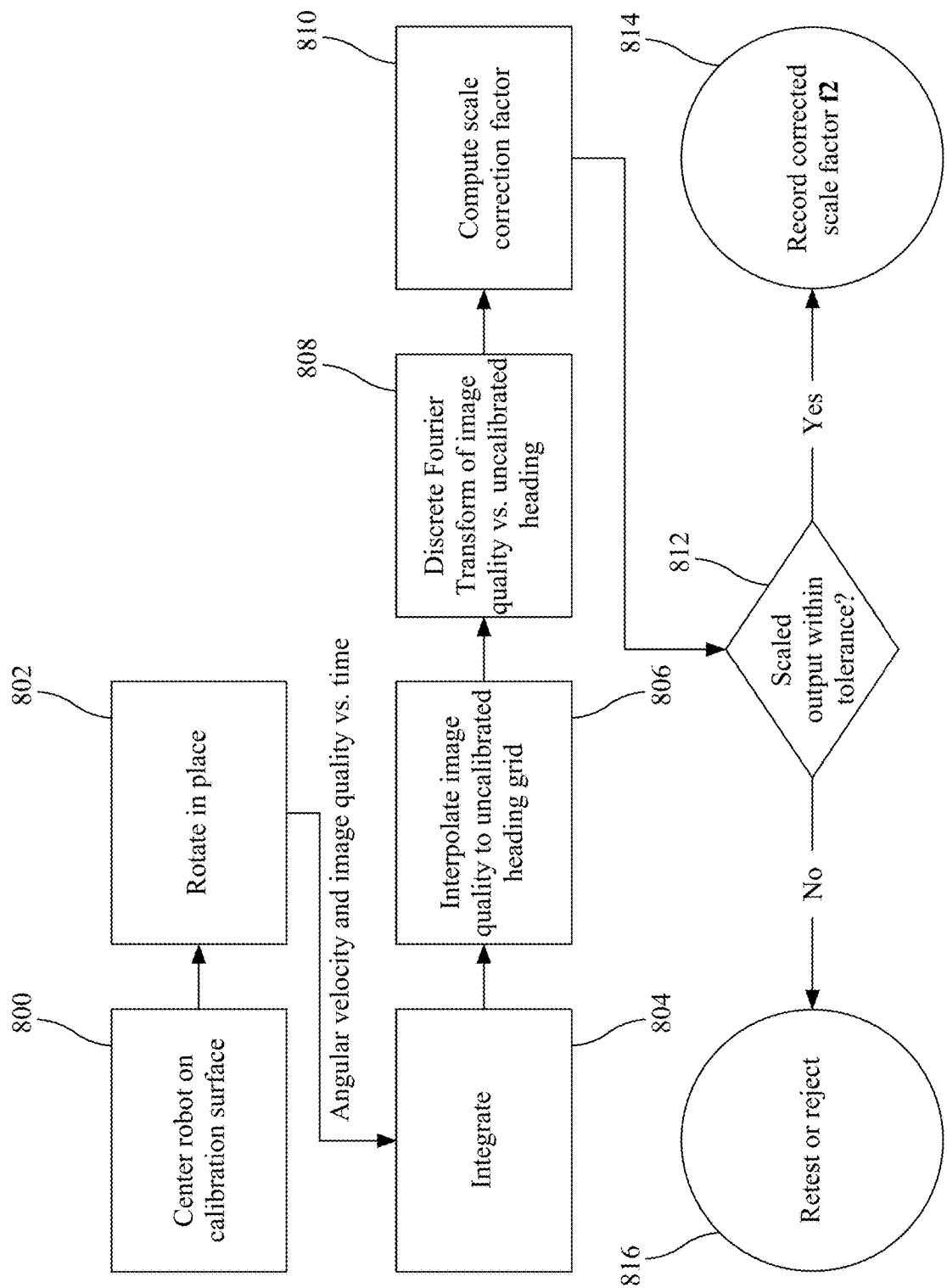
FIG. 8 is a block diagram of an example of gyro scale calibration via a frequency detection algorithm, in accordance with one or more embodiments.

Scale calibration according to an embodiment is depicted in FIG. 8. Therein, at step 800, a robot is centered on a calibration surface, e.g., such as the surface illustrated in FIG. 4. Then, at step 802, the robot is rotated in place, and the gyroscope and optical flow sensor capture angular velocity and image quality, respectively, versus time while the robot is being rotated. Next, at step 804, the angular velocity $\omega$ multiplied by a nominal scale factor $c_{nominal}$ is integrated to obtain an initial, gyroscope-derived heading of the robot. Then the corresponding image quality value(s) are interpolated relative to an uncalibrated heading grid at step 806, the results of which are Discrete Fourier Transformed at step 808 to obtain the $f_{peak}$ value corresponding to the dominant frequency. This enables the calculation of a calibrated or corrected scale factor by calculating: $C_{corrected} = C_{nominal} * [f_{peak}/f_{pattern}]$ as shown in step 810, where $f_{pattern}$ is known a priori. If the scaled output is within a predetermined tolerance value (step 812), then the corrected scale factor can be saved for use in correcting the gyroscope's outputs (step 814) and the process can terminate. Otherwise, if the scaled output is not within tolerance, the flow proceeds to block 816 where a decision can be taken to recalibrate the sensor or to reject the recalibration.

The technique described above with respect to FIG. 8 is suitable for practical use in, e.g., a final calibration of a wheeled robot in a factory (e.g., where the calibration pattern can be provided, where the surface texture necessary to obtain good circular motion can be implemented, and/or where the robot can be placed at a specific location prior to starting its calibration). It has several advantages over calibrating sensors individually prior to assembly. For example, it can measure the sensor characteristics after any stresses in the manufacturing process have taken place, it can verify that the optical flow sensor is reporting image quality values within an expected range (e.g., it is not obstructed or suffering from lens assembly defects), and/or it can be used to verify the robot's ability to move in a circular motion.

Failure to obtain a reliable gyroscope scale calibration through this process implies that one of the above items has failed, which would suggest a manufacturing problem with the robot.

Optical Flow Gain Compensation

In order to obtain the best position tracking possible, OF sensors may implement some form of automatic gain control (e.g., increasing exposure time when an image is dark, and/or decreasing exposure time when an image is bright). If the signal being used for pitch detection is influenced by this, then care should be taken to pre-condition the signal based on the gain settings.

An exemplary algorithm to accomplish this is shown as pseudo-code below:

```
g:   Array of gain observations
s:   Corresponding array of signal observations
0    while multiple_gains_in_data(g):
1        G = most_common_gain(g)
2
3        # Compute average offset between most-commonly-observed gain
4        # and each adjacent data point.
5        for each i where g[i] == G and g[i+1] != G:
6            offset[g[i], g[i+1]] += (s[i+1] - s[i])
7            counts[g[i], g[i+1]] += 1
8        # ... apply same logic to transitions in the other direction
9        offset = {key: offset[key] / counts[key] for each key in offset}
10
11       for each section in data:
12           if is_adjacent_to(section, G):
13               for each i in section:
14                   s[i] += offset[gain_of_section, G]
15                   g[i] = G
```

At a high level, the gain setting and the signal of interest may be recorded, which can be used to develop a map of changes in gain settings versus the corresponding average changes in signal value. An offset may be iteratively applied to map sections of data that are adjacent to the most-commonly-observed gain value to the approximate measurement range observed under the most-common gain settings. This process may be repeated until all data has the same approximate gain setting. While the underlying signal is not necessarily identical on either side of a transition, this process/procedure may reduce the impact of the large jumps in signal that otherwise occur in the presence of gain control.

Image Quality Period Detection on Arbitrary Surface

The frequency-detection approach relied on detecting a signal with known spatial frequency and moving in a near-perfect circle. This concept may be generalized for use on an arbitrary surface. Particularly, if the sensors can be moved through multiple revolutions of the same roughly circular trajectory, a repeating pattern with a frequency of one cycle per revolution can be detected, provided that a few soft constraints are met. For example, the signal may need to have enough spatial variation to change over the course of a revolution, and/or the signal may need to have enough spatial coherence that minor deviations from circular motion do not drastically change the detected image quality metric.

Figure 9A:
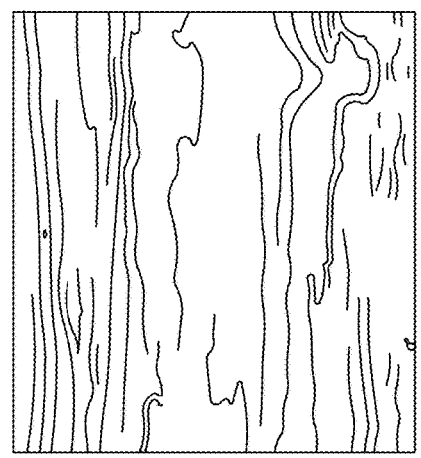
FIG. 9A is an exemplary surface having natural wood grain.
Figure 9B:
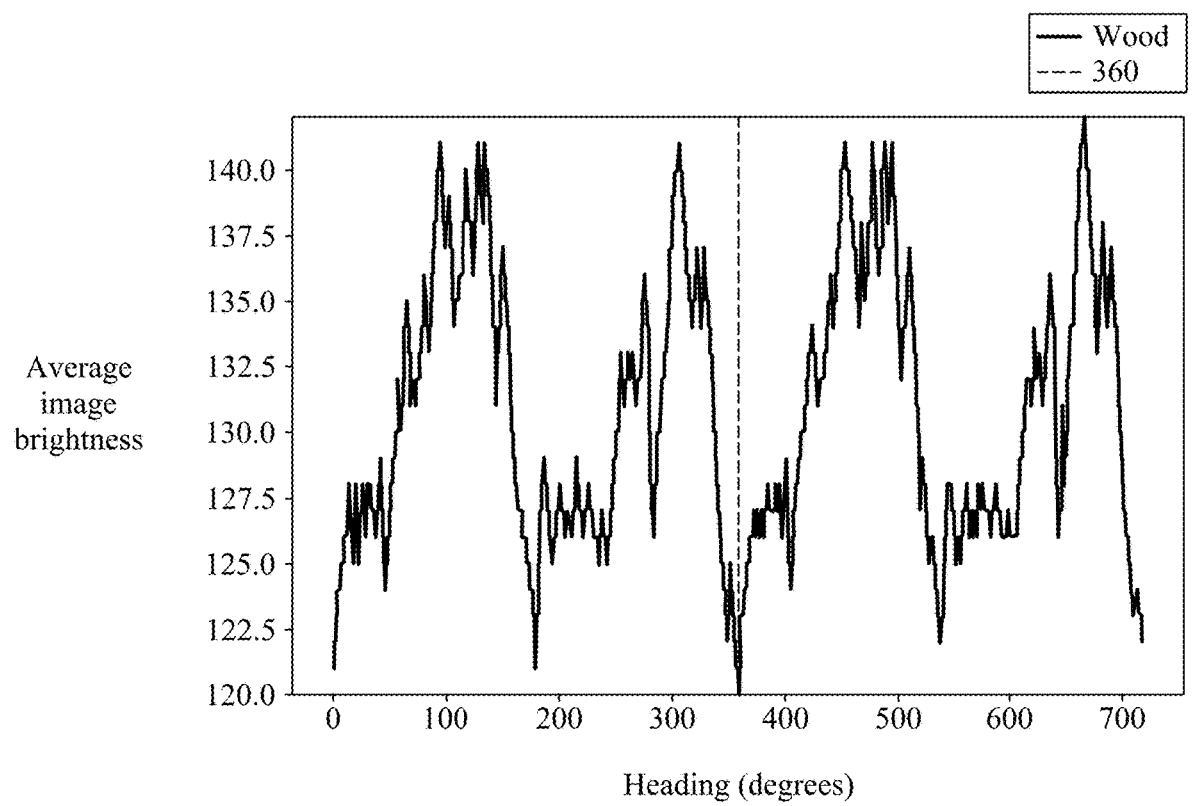
FIG. 9B is a graph illustrating an example of the average intensity detected as a function of angular/heading position of an optical flow sensor operating on a surface having natural wood grain (e.g., in FIG. 9A), in accordance with one or more embodiments.

In one embodiment, the approach described herein considers the brightness of a surface (e.g., a natural wood surface) over the course of a circular trajectory. For example, FIG. 9A shows an example of natural wood grain, and FIG. 9B illustrates a graph illustrating the average intensity detected as a function of angular position when moving an OF sensor in a circular motion over such a surface. The angular distance over which the pattern repeats is nominally 360° (dashed vertical line), and the ratio between 360° and the angular distance obtained by integrating the gyroscope output should yield the correct scale factor for the gyroscope.

In an example, the signal period may be efficiently extracted by 1) recording the estimated angular position and corresponding signal over multiple revolutions and 2) performing an auto-correlation of the obtained series against itself. The shift corresponding to the maximum auto-correlation value is the signal period (e.g., 360° of rotation) in the angular position domain of the gyroscope-derived heading.

Figure 10:
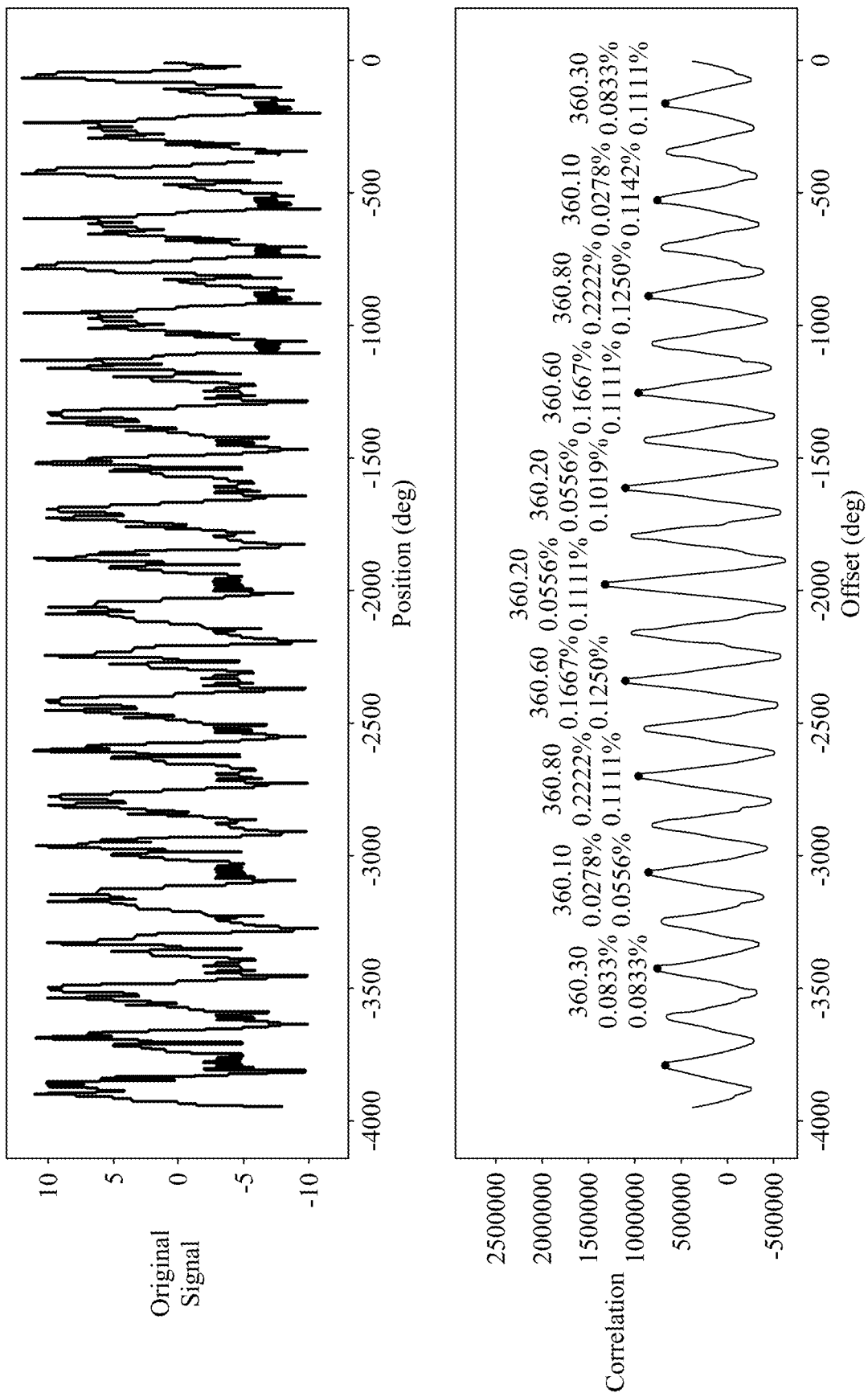
FIG. 10 is a graph illustrating an example of global autocorrelation results for circular motion on a wood surface (e.g., having no scale error), in accordance with one or more embodiments.

FIG. 10 includes two graphs that show an example of a single auto-correlation for nearly-perfect circular motion over a natural wood surface using the true device heading (e.g., no scale error). Each label in the bottom plot shows the length in degrees measured between peaks, the error for this period, and the average period error over all data to that point. Note that while the correlation peaks occur every 360°, smaller peaks are visible between them. These correspond to a 180° shift of the pattern, which highlights the similarity of texture on opposite sides of natural wood grain. Some of the local maxima (e.g., local maxima not corresponding to 360-degree shifts) may be better correlated than the true 360° correlations, so the minimum and maximum scale values may be used to bound the search region for each peak in order to minimize or eliminate the possibility of aliasing to an incorrect rotation. If the true scale is known to be within x % of the nominal scale, then the period between true peaks must be within x % of 360° of the gyroscope heading. In some examples, this information (e.g., typical, minimum, and/or maximum scale values) may be provided by sensor manufacturers.

Figure 11A:
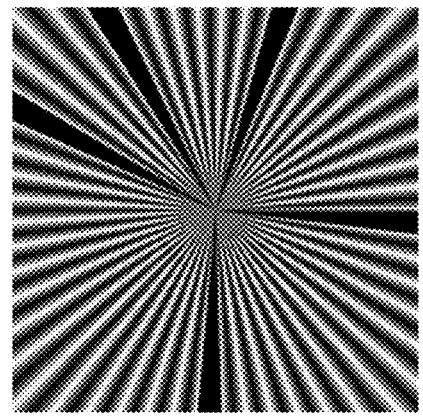
FIG. 11A is a graph illustrating an example of an engineered pattern for a period-detection approach, in accordance with one or more embodiments.
Figure 11B:
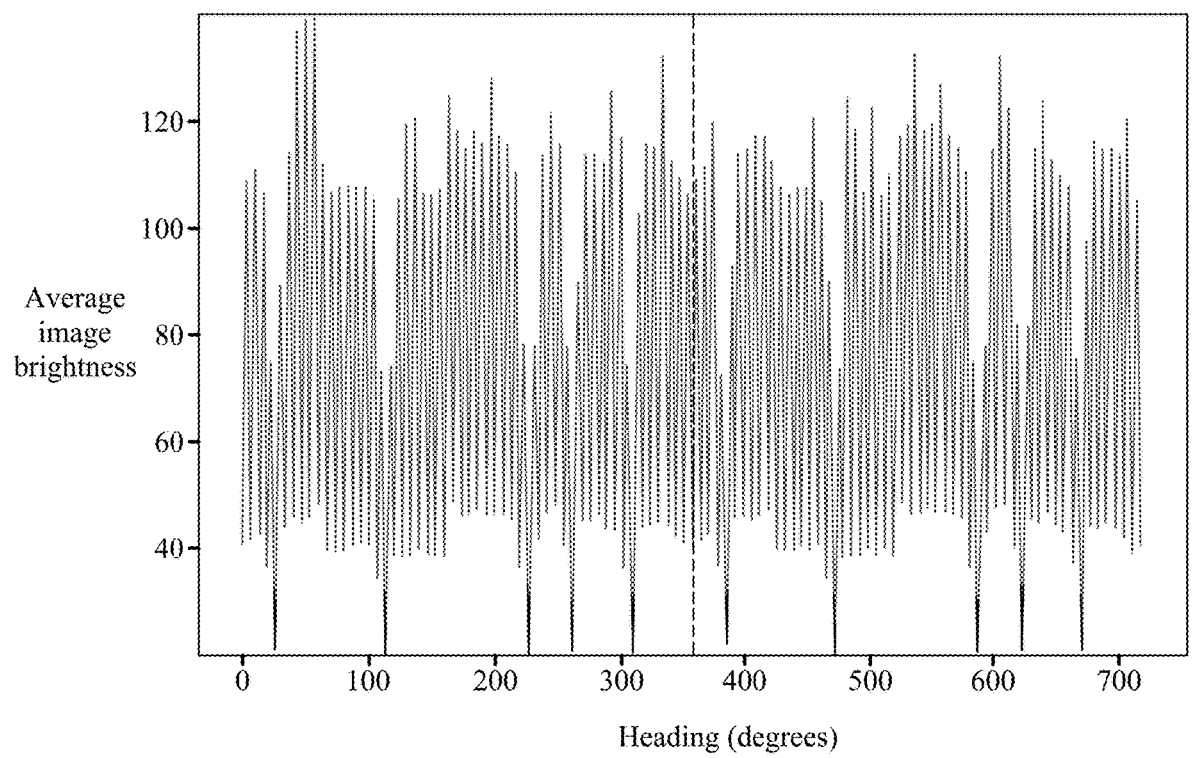
FIG. 11B is a graph illustrating an example of the average intensity detected as a function of angular/heading position of an optical flow sensor operating on a surface having an engineered pattern (e.g., in FIG. 11A), in accordance with one or more embodiments.

This approach may also be applied to an engineered surface (e.g., a surface which has been designed with favorable spatial variation in the signal), provided that the surface has a single global maximum or the scale error is sufficiently bounded to avoid aliasing to an alignment of the high frequency pattern. The surface shown in FIG. 4 may be augmented by adding features that deviate from the basic pattern and provide a means for global alignment, as displayed in FIG. 11A and/or FIG. 11B. Note that this pattern is still dominated by the 53 cycle/revolution signal, but the placement of the wider black bars leads to a single best-possible alignment. Only a 360-degree shift in this pattern would cause all 5 of the wide black bars to align with wide bars from rotation to rotation (i.e., all 5 wide bars would align with themselves again). No amount of rotation other than 360 degrees would cause any more than one of the wider black bars to align with another one of the wide black bars from rotation to rotation (yielding a weak correlation). For example, a 90 degree clockwise rotation might cause the wider black bar at the 3 o clock position in FIG. 11A to align with the position of the wider black at the 6 o clock position in FIG. 11A, but none of the 4 other wide black bars would so align. This pattern is suitable for running both this method and the one described in pattern frequency detection on an engineered surface disclosed above. The pattern depicted herein is representative, and other patterns may also be used having one or more favorable signal characteristics.

Figure 12:
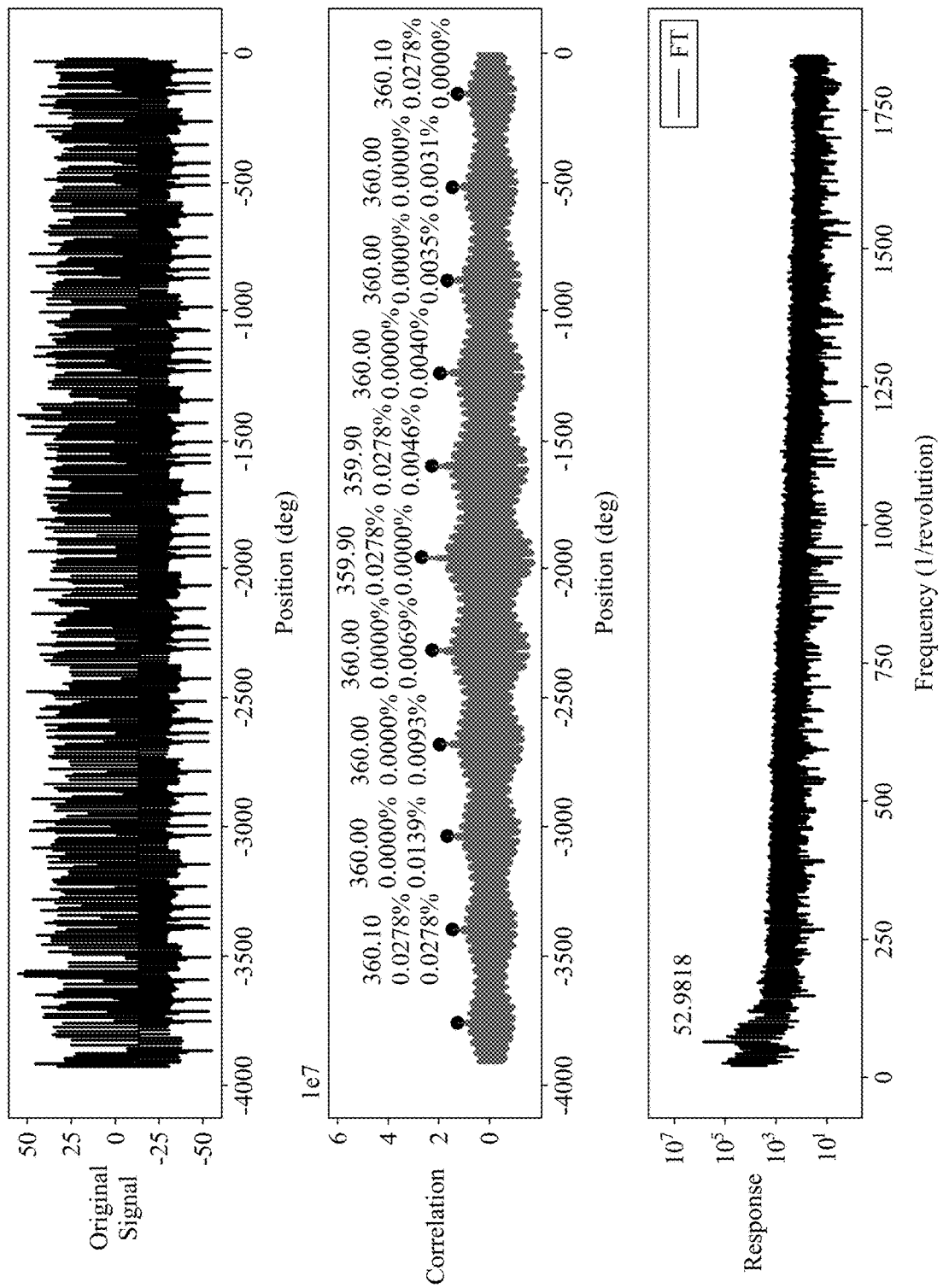
FIG. 12 includes graphs illustrating an example of autocorrelation and DFT of motion over engineered surface(s), in which global alignment bars leave the peak frequency intact, in accordance with one or more embodiments.

When the approaches described in this section (and/or in pattern frequency detection on an engineered surface disclosed above) yield different results, this may imply that the gyroscope and optical flow sensor are working as expected (e.g., establishing a good revolution period), but the robot motion is sufficiently non-circular that the dominant frequency is shifted from the nominal one. In an example, FIG. 12 shows the original signal, its auto-correlation (with a detected period), and the corresponding DFT when performing a nearly-circular rotation over the engineered surface depicted in FIG. 11A.

Figure 13:
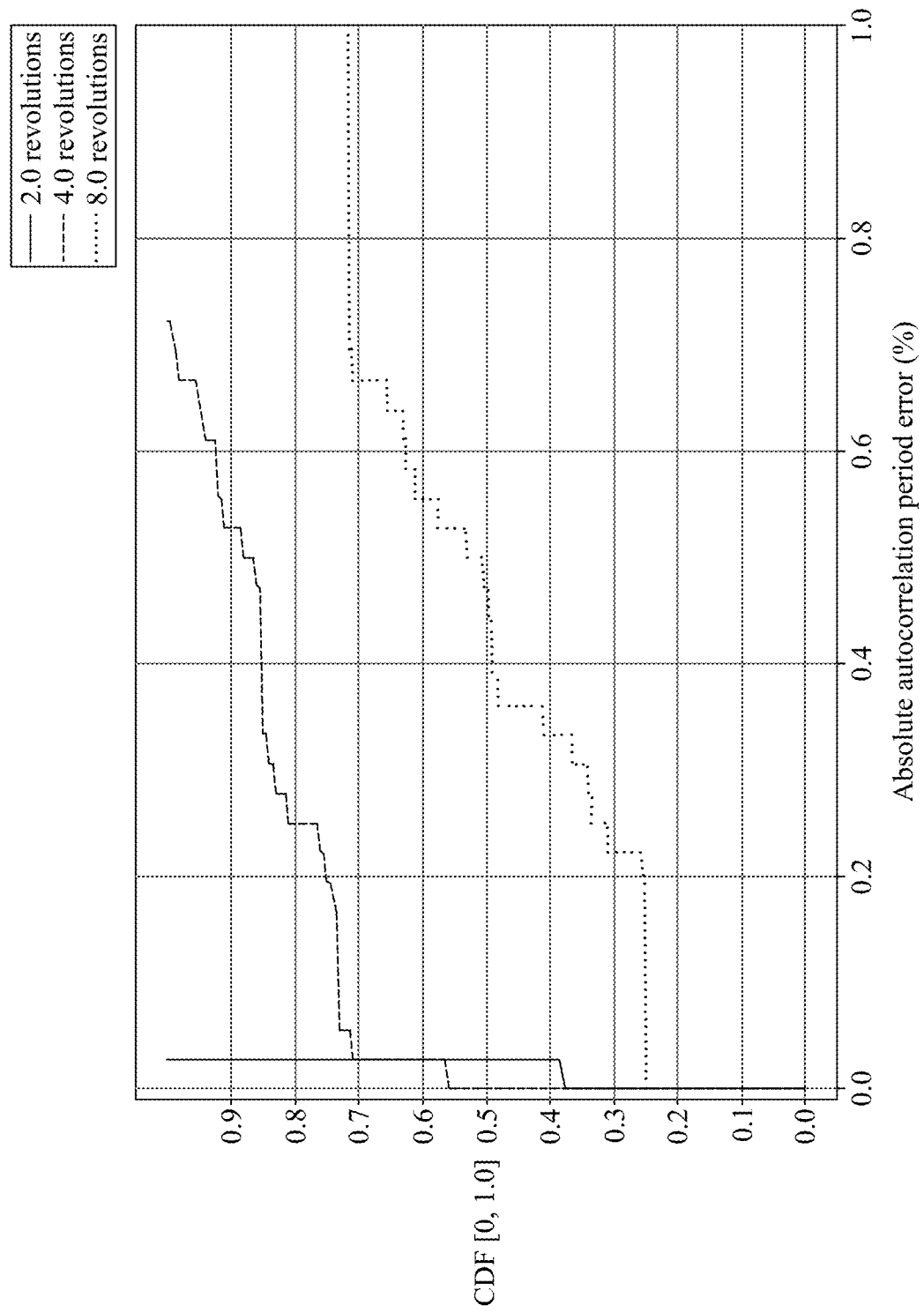
FIG. 13 is a graph illustrating an example of CDF of error introduced by non-circularity, including a situation of autocorrelation when motion-induced changes to underlying signal do not accumulate, in accordance with one or more embodiments.

Wheeled robots may not move in perfectly circular motions. For this reason, obtaining a single best correlation for a long data capture will suffer as non-circularities manifest as changes in the underlying signal. In an example, these issues may be mitigated by performing multiple correlations across overlapping 720° windows rather than attempting to find a single best period that maximizes correlation over a much longer input series. For example, FIG. 13 shows the distribution of recovered period lengths when simulating non-circular motion on the engineered surface with no heading error. The motion in this case was obtained by using position measurements of a 2-wheeled robot (attempting to spin in place on a smooth surface) to sample from the data collected using nearly-circular motion on the engineered surface. In the data shown with a solid line, a period estimate was obtained for every overlapping 2-revolution window and the cumulative distribution function (CDF) of these estimates' errors is plotted. The dashed and dotted lines use the same data, but estimate periods with overlapping 4-revolution and 8-revolution windows, respectively. In this case, the advantage of having more data for correlation in long windows was outweighed by the disadvantage of accumulated non-circular motions shift the observed pattern. The motion used to simulate this maintained a roughly constant radius of the optical flow sensor to the center of rotation (10 cm), but the center of rotation moved roughly 3 mm in a random direction with each revolution. The optimum window length used to estimate periods will vary depending on how well the robot can maintain a circular motion, for example, the closer the motion is to being circular, the longer the window can be.

The mechanism used for aggregating the results of multiple overlapping windows is somewhat arbitrary. In an example, an approach is to discard outliers in the results and then to take a weighted mean of the remaining results, where greater weight is assigned to windows having higher autocorrelation values.

Figure 14:
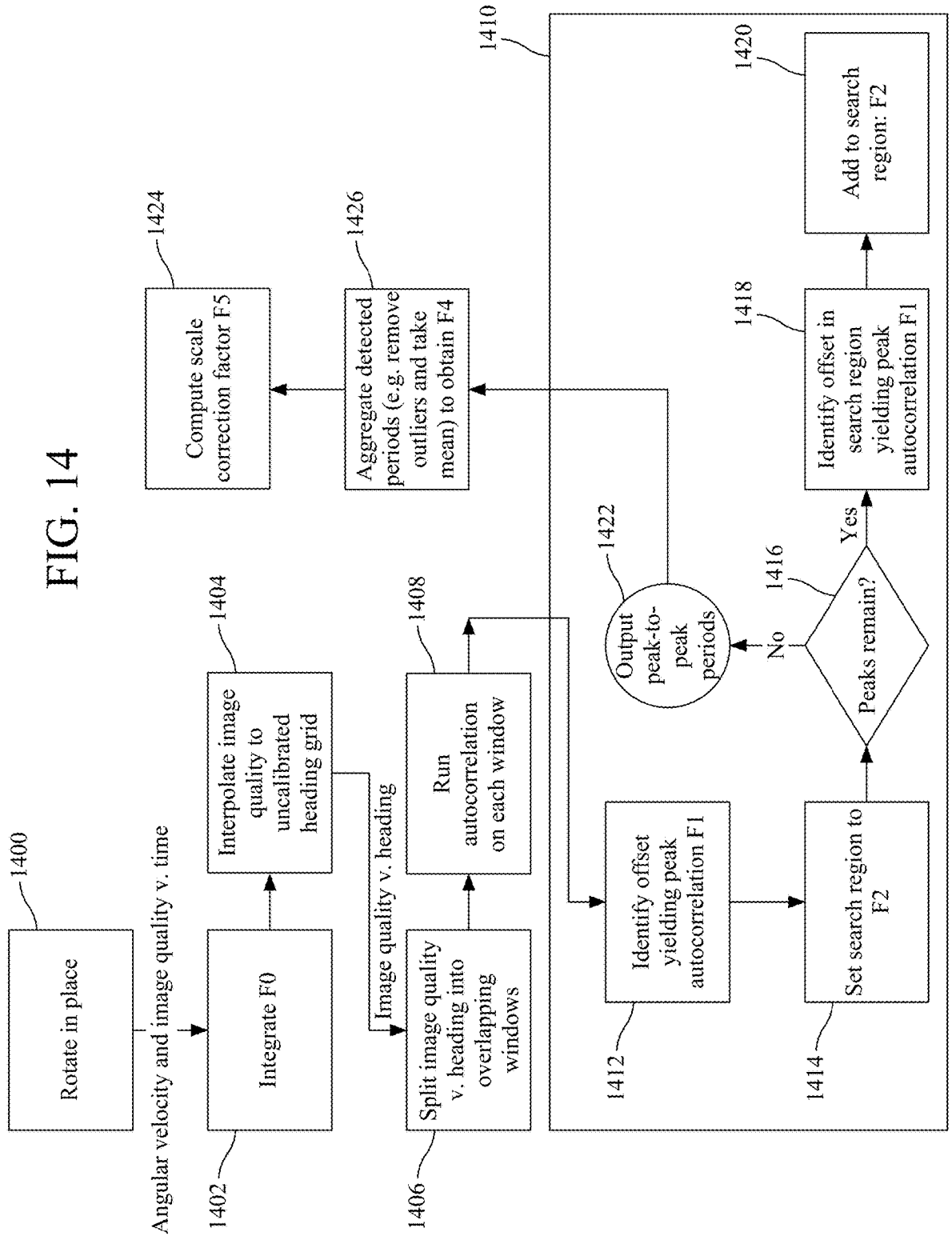
FIG. 14 is a block diagram of an example of a gyroscope scale calibration algorithm using autocorrelation of image quality, in accordance with one or more embodiments.

FIG. 14 is a block diagram illustrating an exemplary gyroscope scale calibration algorithm/mechanism, using autocorrelation of image quality according to an embodiment. First, the input data (uncalibrated heading and image quality) is collected by a robot rotating in place over some surface at step 1400, and then calculating the angular velocity ω multiplied by a nominal scale factor $c_{nominal}$ is integrated to obtain an initial, gyroscope-derived heading of the robot at step 1402 and the corresponding image quality value(s) are interpolated relative to an uncalibrated heading grid at step 1404, in a manner which is the same or similar to the corresponding steps 802, 804 and 806 described above. Then, this data is split into overlapping windows as described above (with window length dictated by how circular the robot motion is expected to be) at step 1406. Then, an autocorrelation is performed within each window at step 1408. The substeps associated with the autocorrelation are shown in block 1410. Therein, the global maximum in the autocorrelation is identified at step 1412, and the two adjacent regions to this peak (which are within the expected scale error bounds (e.g., close to +/−360° from the global peak)) are set as the initial search region at step 1414. In some cases, this process is repeated (e.g., to find the maximum autocorrelation in the current search region and expand the search region) until no peaks remain in the current window as described by steps 1416, 1418 and 1420. The peak-to-peak periods discovered in each window (step 1422) are aggregated in step 1424 to obtain a single estimated period of the uncalibrated gyroscope which corresponds to a known 360° rotation. This is used to obtain the calibrated gyroscope scale value at step 1426. The values for variables F1-F5 referred to in the flow diagram are set forth below in Table 1.

TABLE 1

| | |
|---|---|
| F0 | ω · $c_{nominal}$ |
| F1 | $\theta_{peak}$ |
| F2 | $\theta_{peak} \pm [360° \cdot c_{min}, 360° \cdot c_{max}]$ |
| F4 | $\hat{p}$ |
| F5 | $c_{corrected} = \dfrac{360°}{\hat{p}}$ |

Identification of Suitable Calibration Surfaces

In various embodiments, the approach described herein may use suitable variation over the course of a revolution to yield a single global fit. The approach described in this section requires suitable variation over the course of a revolution to yield a single global best fit, but not so much variation over a small displacement that imperfect rotation yields vastly different signals.

A simple approximation to identify a surface with one or more characteristics is to record the short-term and long-term variance ($\sigma^2_s$ and $\sigma^2_l$) of the image quality signal that will be used for correlation. The variance should be computed over both a small distance window (having length $d_s$ on the order of the drift in center-of-rotation introduced by a single revolution) and a long distance window (having length $d_l$ on the order of the rotation circumference used for period detection). A suitable calibration surface is one where $\sigma^2_l$ is above a threshold $t_l$ and, during that same measurement period $\sigma^2_s$ is below a threshold $t_s$. The actual choice of these thresholds and distances may vary across sensors and robots. Thus, this embodiment enables a robot to select its own calibration surface in, e.g., a home or office by searching for a surface that has enough large-scale variation in the surface to yield a single best correlation, but not so much small-scale variation that a slight deviation from circular motion causes a revolution to be totally dissimilar. For example, a checkerboard pattern might have sufficient large-scale variation to yield a single best correlation, but if the robot slips even slightly then the pattern it views on one rotation will be very different from the next (small-scale variation is high). On the other hand, on a totally uniform surface, the small-scale variation is low (so each revolution looks similar to the last one, even if the robot slips). However, the large-scale variation is also low and there is no global best correlation. Thus something between those two types of surfaces that provides enough, i.e., more than a first predetermined threshold, large-scale variation but not too much, i.e., less than a second predetermined threshold, small scale variation can be identified by the robot as an appropriate surface to use for calibration.

Identification of Fixed Reference Marks Using Image Quality

A third approach/technique to determining a repeating pattern with an OF sensor replaces cycle detection with detection of discrete points having known spatial relationships to each other.

Figure 15:
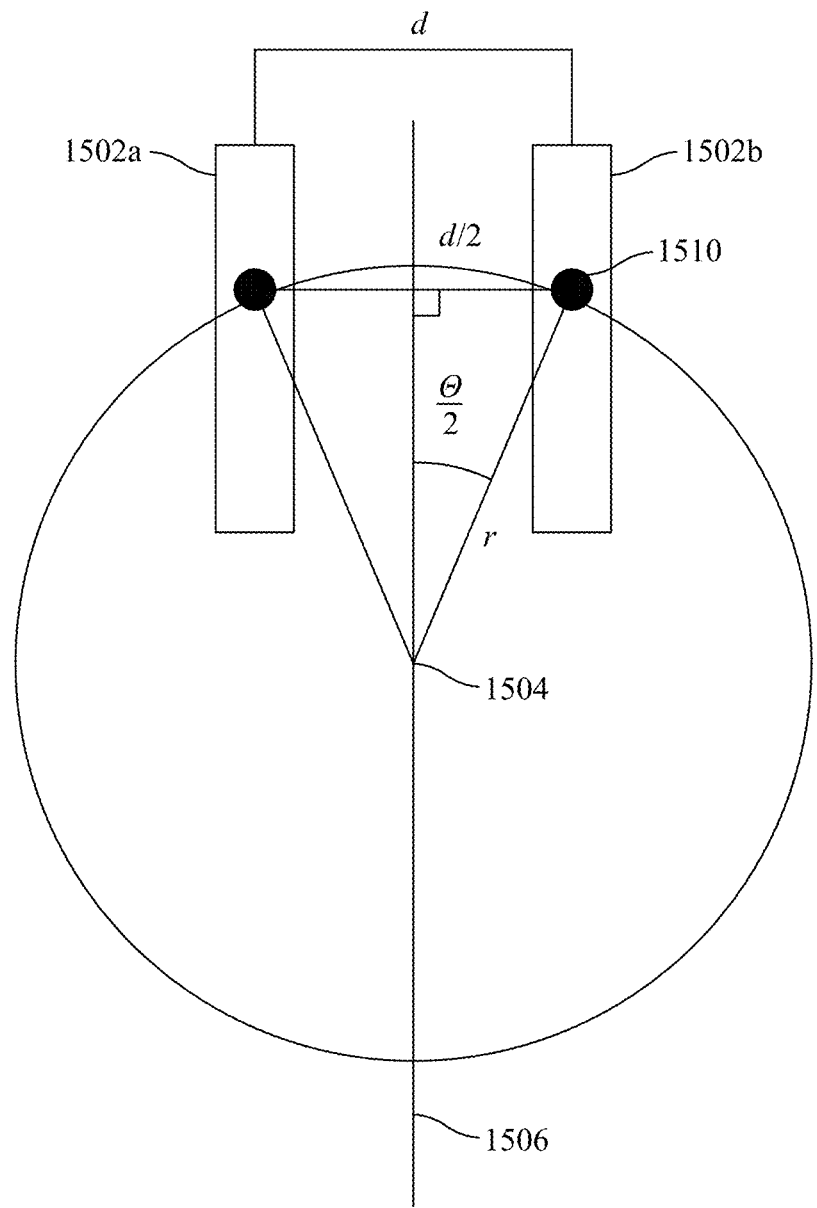
FIG. 15 is a block diagram illustrating an exemplary physical layout for reference mark-based angular distance detection, in accordance with one or more embodiments.

In this approach, multiple distinct reflective markers may be placed on a surface at known positions. FIG. 15 shows a possible arrangement of reflectors. In this example, they are two parallel reflective strips 1502a and 1502b. The wheeled robot may position itself so that its center of rotation 1504 is located at some point on the line 1506 that is equidistant to and parallel to each strip 1502a, 1502b. Then, the robot may be rotated back and forth to cause the OF sensor 1510 to become positioned first over the center of one of the strips (e.g., 1502b) and then over the center of the other of the strips 1502a (e.g., 1502a) (two strips is merely exemplary and there may be more strips) while the gyroscope measures the heading change between those two positions. The angular distance measured between these marks may be combined with the known angular distance between the two strips to obtain a scale between the gyroscope and ground truth as measured by the OF sensor. The optical flow sensor is positioned on the robot at a fixed radius r from the center of rotation 1504 of the robot.

In this case, the robot system may determine the angles $\hat{\theta}_0$, $\hat{\theta}_1$ at which the OF sensor is over the centers of the first and second reflective strips, respectively, by integrating the angular velocity as measured by the gyroscope between the start of the motion and the time when the OF sensor is centered over each reflective strip, respectively. With a known distance d between the marks and a known radius r at which the optical flow sensor rotates, the robot system may obtain:

$$\theta = 2\arcsin\frac{d}{2r}$$

and compute a scale factor $$c = \frac{\theta}{\hat{\theta}_1 - \hat{\theta}_0},$$

which can be used to correct gyroscope measurements. In the common case where the start position is not meaningful, integration errors can be reduced by letting $\hat{\theta}_0=0$ and beginning the integration when departing the first detected mark.

Figure 16A:
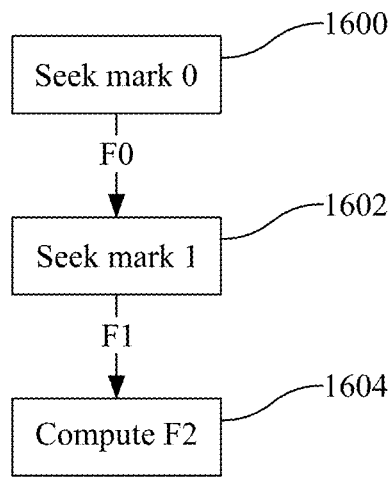
FIGS. 16A and 16B are block diagrams illustrating an exemplary mark detection mechanism, in accordance with one or more embodiments.
Figure 16B:
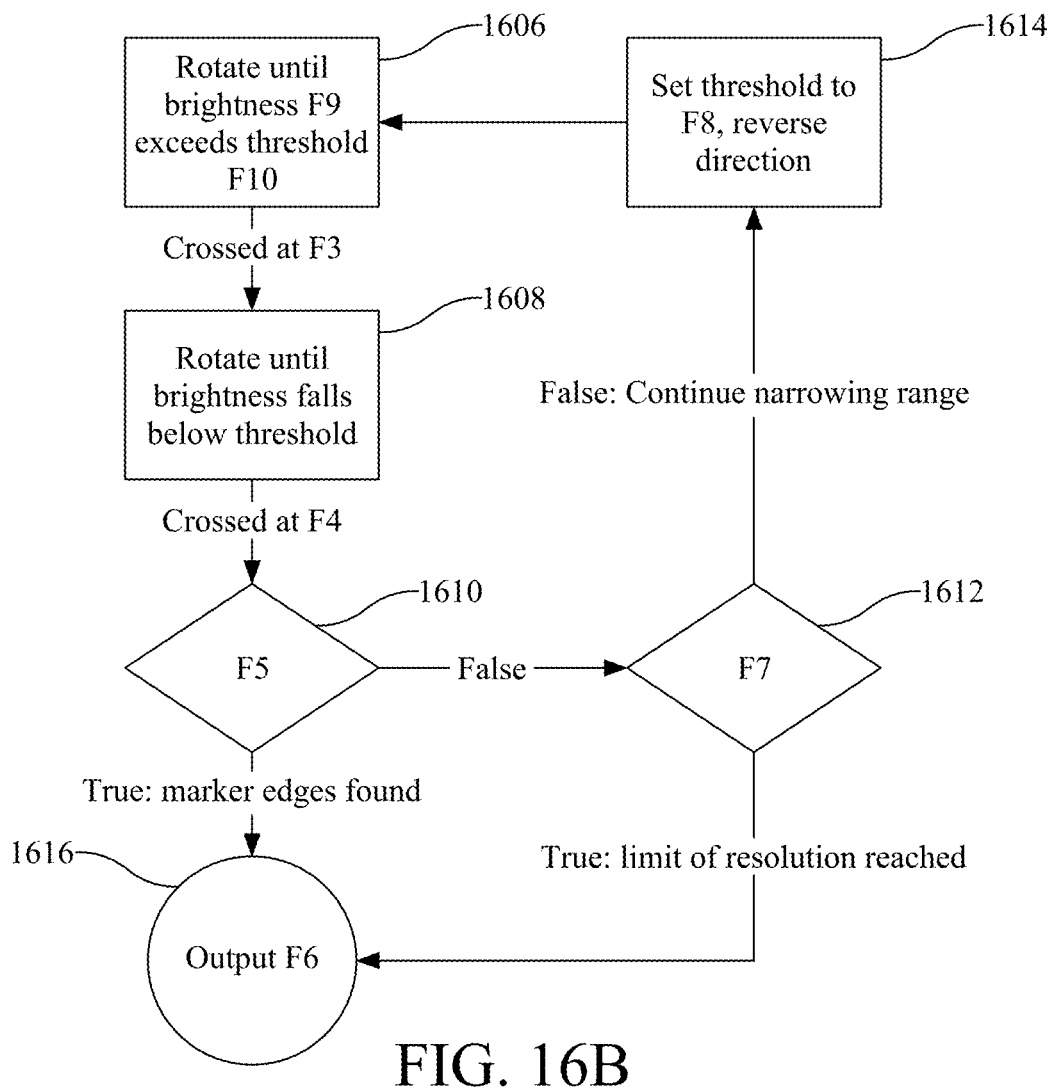

In one embodiment, the overall flow of the algorithm used to perform the scale factor calculation described above with respect to FIG. 15 is depicted in FIGS. 16A and 16B. As stated above, and shown in FIG. 16A, the overall algorithm uses a set of steps to seek a first mark at step 1600, then uses the same (or similar) set of steps to seek a second mark at step 1602, after which it computes the scale factor at step 1604 based on the detected marks angular positions of the two marks (identified as F0 and F1 in the table below). The basic idea of the steps used to seek each mark is that when the OF sensor is over a reflective surface, there will be a plateau in the image intensity—the center of the reflective surface will be on that plateau somewhere (but the actual maximum value observed may not be directly over the center). So this algorithm obtains the angular position of each edge of this plateau and keeps revising the threshold required to be on the plateau upward until a desired accuracy limit is reached.

Two stop conditions are introduced to make it practical. A first stop condition indicated by φ in the table below dictates the angular width of the detected mark at which point the robot system stops seeking and relates to the angular width over which the peak observed value may span. A second stop condition τ in the table below dictates how close the threshold for mark in view may approach the peak value observed and relates to the granularity with which the system can resolve differences between the peak value and non-peak values. The steps associated with each mark detection step 1600 and 1602 are illustrated in FIG. 16B.

Therein, the process begins by initiating plateau threshold $x_{thresh}$ (step not shown in FIG. 16B but referred to as F11 in Table 2 below). Then, at step 1606, the robot is rotated (either clockwise or counterclockwise) over the mark until the detected brightness exceeds the threshold $x_{thresh}$. The angular position at which the detected brightness crosses the threshold is stored (F3) as a first temporary marker edge and the process moves on to step 1608 wherein the robot is rotated until the brightness level falls below the threshold, i.e., the robot comes off the other edge of the marker. This angular position (F4) is recorded as the second temporary marker edge and the process moves on to step 1610, wherein it is determined using the first stop condition whether the difference between the two stored angular positions is large enough that marker edges can be considered to have been found (as shown by the check F5 in the table below). If that determination yields a true result, then the process moves to step 1616 wherein the final angular position of the mark is output as F6.

If the determination made at step 1610 is false, then the process moves to step 1612 where another check is made. Specifically, the second stop condition is checked to determine whether (given the resolution of the optical sensor) it would not be expected that reducing the threshold $x_{thresh}$ would improve the accuracy of the edge detection process. If the check at step 1612 (e.g., made using F7 in the table below) is true, then the process ends at step 1616 by outputting the final angular position of the detected mark. If false, then the threshold can be reduced at step 1614 (e.g., using F8) and the process repeats until one of the stop conditions is met.

TABLE 2

| F0 | $\hat{\theta}_0$ |
|---|---|
| F1 | $\hat{\theta}_1$ |
| F2 | $^c\text{corrected} = \dfrac{\theta}{\hat{\theta}_1 - \hat{\theta}_0}$ |
| F3 | $\gamma_0$ |
| F4 | $\gamma_1$ |
| F5 | $\lvert \gamma_1 - \gamma_0 \rvert < \phi$ |
| F6 | $\hat{\theta} = \dfrac{\gamma_0 + \gamma_1}{2}$ |
| F7 | $^x\text{peak} - {}^x\text{thresh} < \tau$ |
| F8 | $^x\text{thresh} := \dfrac{^x\text{peak} + {}^x\text{thresh}}{2}$ |
| F9 | x |
| F10 | $^x\text{thresh}$ |
| F11 | $^x\text{thresh} := {}^x\text{init}$ |

In one embodiment, the main requirements for this approach may be:

- The image quality signal must be sufficiently different when a reflective mark is in view and a reflective mark is not in view to obtain a good estimate of each reflector's center
- The robot must align its center of rotation to the center axis of the reflector array
- The robot's rotation must have a constant radius and lack side-to-side drift.

This approach is more sensitive to minor disturbances than the previously disclosed approaches, as the calibration is based on detecting two discrete points rather than a correlation over a much larger data set. In some examples, this approach is a solution that can perform gyroscope scale calibration outside of a factory setting. A practical deployment scenario may be to add two reflective strips to the charging station used by a domestic robot. In order to charge, a robot needs to align itself with electrical contacts on the station, and this can be exploited to minimize the amount of uncontrolled motion required from a known pose to the end of the calibration motion.

Variations

This approach could also be extended to include any number of reference marks for redundancy and detection of non-circular motion, though that does not substantially alter the formulation above.

This approach could be performed with a single reference mark where the robot performs a full revolution between detections. In this case, A is 360°.

Optical Flow Scale Estimation With Gyroscope Scale and Known Geometry

With an accurate gyroscope scale and a priori knowledge of the robot's rotation behavior and sensor geometry, the robot system can overcome the surface-dependence of the Optical Flow sensors distance scale. The relationship between the distance reported by an OF sensor and the actual distance over which the OF sensor travels is primarily determined by the vertical distance of the image sensor to the tracking surface. This distance may vary as a robot moves across different surfaces (e.g., carpet or tile) or as the robot characteristics change (e.g., the weight it is carrying changes, which affects how high its wheel suspension lifts its chassis from the ground). For these reasons, an enhanced approach may be desired for quickly and directly measuring the optical flow scale during operation.

Once the gyroscope scale has been obtained (e.g., via the methods/approaches described in "Relevant Approaches"), the robot can rotate in place: the total distance traveled by the optical flow sensor can be estimated with the gyroscope (with a known device geometry) and can be measured by the optical flow sensor itself, allowing one to obtain a scale constant that is specific to the surface upon which the rotation was performed.

In various embodiments, the robot may be spinning about its center and the displacement $^R\vec{r}^O$ of the OF sensor relative to this point is known. In an example, for simplification, it is assumed that the motion is planar, the Z axis of each frame is aligned, and rotation is confined to the X-Y plane (rotation is scalar about the Z axis). This means that the robot system may treat the angular velocity measured by the IMU as if it was measured at the OF sensor. Assume that both the IMU and the OF sensor are sampled simultaneously and with a sample frequency of $$f_{sample} = \frac{1}{\Delta t},$$

where $\Delta t$ is the time between consecutive samples.

The relationship between the OF sensor output and the gyroscope output may be interpreted with respect to each other in both the velocity domain and/or position domain.

Velocity Domain Interpretation

Optical Flow Frame

In various embodiments, the linear velocity at the optical flow sensor given by the rigid-body relationship is:

$$^O\vec{v}^O = R_{R \to O} \cdot (^R\vec{v}^R + \omega \times {}^R\vec{r}^O)$$

Under the assumption that the robot is performing a pure rotation ($^R\vec{v}^R = 0$) and with angular velocity varying with time, the robot system may obtain an estimate of the linear velocity at the optical flow sensor based on the angular velocity measured by the IMU, $\omega_I$:

$$^O\vec{v}^O(t) = R_{R \to O} \cdot (\omega_I(t) \times {}^R\vec{r}^O)$$

Since $R_{R \to O}$ is a rotation about Z which does not change with time, and $\omega_I(t)$ is assumed to be planar (Z only), it can be further simplified to:

$$^O\vec{v}^O(t) = \omega_I(t) \times (R_{R \to O} \cdot {}^R\vec{r}^O)$$

At each point in time, the robot system may obtain a measurement of the linear velocity from the OF sensor, denoted $^O\vec{v}^O_o(t)$. The OF sensor may not produce velocity output per se, measuring displacement (in pixels) between two points in time. However, under the assumption that the OF sensor is polled at a constant rate (or suitably post-processed), an equivalent velocity may be obtained.

The robot system may then obtain an estimated scale factor relating the (uncalibrated) optical flow displacement output to the (calibrated) gyroscope velocity by applying a suitable optimization (e.g. least squares) to obtain the relationship $$V_I = \alpha V_o$$

$V_I$ and $V_o$ are the n×2 matrices where the i-th row of each matrix corresponds to the i-th sample taken by each sensor: $^O\vec{v}^O_I(i\Delta t)$ and $^O\vec{v}^O_o(i\Delta t)$.

Earth Frame

The displacement reported by the optical flow sensor while in a circular trajectory can be converted to an angular distance:

$$|\vec{r}|\theta_i = |\vec{x}_i|$$

$$\theta_i = \frac{|\vec{x}_i|}{|\vec{r}|}$$

Where $\vec{x}_i$ is the displacement reported in the i-th sample interval for the OF sensor (at time $t=i\Delta t$). This yields an angular velocity predicted by the optical flow sensor $$\omega_O(i\Delta t) = \frac{\theta_i}{\Delta t}.$$

Similar to the above, the robot system may then use a suitable optimization method to obtain the scale factor $\alpha$ which best fits $$\Omega_I = \alpha \Omega_O$$

Where similar to the linear velocity formulation above, $\Omega_I$ and $\Omega_o$ are the n×1 vectors where the i-th element of each vector corresponds to the i-th angular velocity furnished by each sensor: $\omega_I(i\Delta t)$ and $\omega_o(i\Delta t)$.

Position Domain Interpretation

Optical Flow Frame

The linear distance traveled by the optical flow sensor (in the frame of the optical flow sensor) can be obtained by integrating the velocity with respect to time. Using the IMU to obtain this, the robot may have:

$$^O\vec{d}^O_I(n\Delta t) = \left(\sum_{i=0}^{n-1}\omega_z(i\Delta t)\Delta t\right) \cdot \left(R_{R\rightarrow O} \cdot \begin{bmatrix} -^R\vec{r}^O_y \\ ^R\vec{r}^O_x \end{bmatrix}\right)$$

where $^O\vec{d}^O_I$ is the distance measurement in the optical flow sensor's frame of reference as computed by the IMU. Note that while this is a 2-d quantity, $^R\vec{r}^O$ is a constant vector in the robot frame and should not be confused with the (time-varying) vector in the global frame from the center of rotation to the optical flow sensor.

The OF sensor may report a 2-dimensional (2-D) displacement every time it is polled (relative to the last time it was polled). It may suffice to sum the OF sensor output $\vec{x}$ at each interval:

$$^O\vec{d}^O_O(n\Delta t) = \sum_{i=0}^{n}\vec{x}_i$$

This yields the distance measurement in the optical flow sensors frame of reference as computed by the optical flow sensor.

Under the assumptions that the optical flow scale is constant throughout this motion, the gyroscope has previously been calibrated, and there is no cross-axis skew in the optical flow sensor output, then the robot system may relate the optical flow output to the actual linear distance traveled with:

$$c_x = \frac{^O\vec{d}_{Ox}}{^O\vec{d}_{Ix}}$$

$$c_y = \frac{^O\vec{d}_{Oy}}{^O\vec{d}_{Iy}}$$

Under the simplifying assumption that scale is identical on each axis of the optical flow sensor, the robot system may obtain a single scale constant based on the total distance measured with each sensor (disregarding direction).

$$c = \frac{|^O\vec{d}_O|}{|^O\vec{d}_I|}$$

For instance, in the case that one of the optical flow sensor's axes is perpendicular to the motion, the above calculation may be used.

Earth Frame

The method/approach described above in the velocity domain interpretation may be interpreted in the position domain. The total angular distance traveled as measured by the gyroscope may be related to the total angular distance traveled as computed by the optical flow displacement and radius by a constant scale factor c.

$$\Theta_O = \sum_{i=0}^{n}\frac{|\vec{x}_i|}{|\vec{r}|}$$

$$\Theta_I = \sum_{i=0}^{n}\omega(i\Delta t)$$

$$\Theta_I = c\Theta_O$$

Relationship to Previously-Described Methods

The same physical motion which is used to measure the gyroscope scale vs. image quality period of an unknown surface is used to establish the optical flow sensor distance scale, and these two processes may be combined.

Alternative Embodiments and Extensions

The general concept of using periodic signals in the surface image quality to estimate robot motion may have further domain-specific applications. This section briefly describes several related methods which may find use in similar situations.

Image Matching for Period Detection

The methods described above use the concise and high-level image quality metrics reported by the optical flow sensor to work. Some optical flow sensors provide access to the actual surface image upon which motion is detected. When this is available, several further improvements are possible.

Pixel-Scale Reference Mark Detection

The method described in "identification of suitable calibration surfaces" may include estimating the center of the region within which the reference mark is visible by scanning back and forth over the mark. If the shape of this region is not an arc (e.g. due to accidental linear motion) or if the perceived mark area changes over time (e.g. due to lighting or tilt changes), then the estimate of the mark center will degrade.

Figure 17:
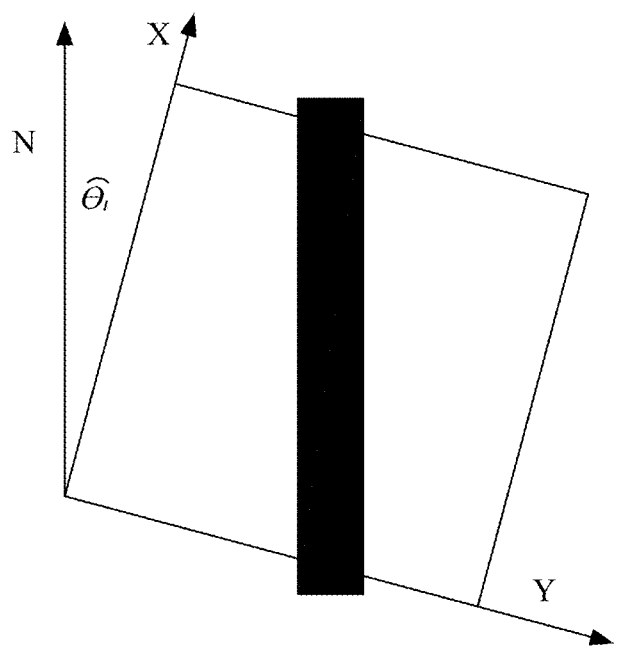
FIG. 17 is a graph illustrating an example of relationship between reference mark orientation and sensor orientation, in accordance with one or more embodiments.

However, if the robot system can resolve the actual shape of the mark when the OF sensor is approximately centered over the marker, these issues can be counteracted. If the edge of the mark is sufficiently straight and in a known orientation, then the robot system may detect the sensor orientation relative to it. FIG. 17 shows an example of the perceived mark in the sensors reference frame, and how this could be used to obtain the angular position of the sensor with respect to whatever known orientation corresponds to the mark's direction (in this case labeled "N").

If the reference marks have a known orientation relative to each other (e.g. are parallel), then the robot system may directly measure the difference in heading at the start and end of the test motion and compare this to the integrated gyroscope measurement. As long as the calibration motion can cover two reference marks, the motion taken between them is not subject to the circularity and center-of-rotation constraints described in "identification of suitable calibration surfaces".

True Heading on Engineered Surface

The approach above can be further extended to obtain near-continuous heading measurements on an engineered surface consisting of multiple parallel lines.

Intrinsic Detection of Non-Circular Motion

When motion is perfectly circular, the angular velocity measured by the gyroscope should be related to the perceived linear velocity at the optical flow sensor by a simple scale factor (dictated by the distance of the center of rotation from the OF sensor and the scales of the respective sensors). The methods proposed in this document outline approaches to estimate the gyroscope scale (vs. true angular velocity) and the optical flow scale (vs. angular distance traveled) and rely to some greater or lesser extent on the calibration motion being circular.

Figure 18:
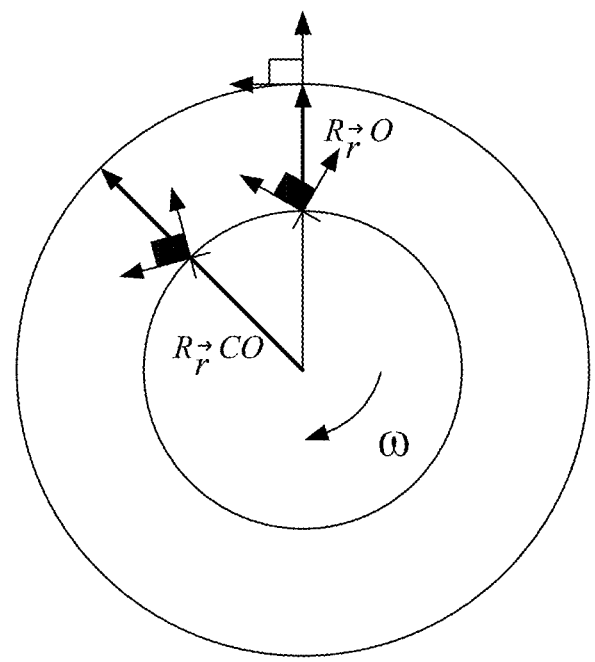
FIG. 18 is a graph illustrating an example of circular motion with center of rotation not at a robot center, in accordance with one or more embodiments.

The circularity of motion can be measured without knowing either the sensor's scale or the true radius of rotation, and this basic technique is likely to be useful for practical applications of the methods above. The formulations presented so far have generally assumed that the robot is rotating about its center for simplicity. FIG. 18 is a figure illustrating an example of circular motion with center of rotation not at a robot center and showing the relationship between relevant quantities during such motion.

The linear velocity at the optical flow sensor in the robot and optical flow frames is previously described by using the velocity of the robot and the displacement of optical flow sensor with respect to the robot center $${}^R\vec{v}^O = {}^R\vec{v}^R + \omega \times {}^R\vec{r}^O$$

A similar rigid body relationship can be used to obtain the optical flow sensors velocity from the velocity of the center of rotation and the displacement of optical flow sensor with respect to the center of rotation at a given instant in time. Please note that the center of rotation is not always at the robot center.

$${}^R\vec{v}^O = {}^R\vec{v}^{CO} + \omega \times {}^R\vec{r}^{CO}$$

Then the linear velocity as measured by the optical flow sensor would be:

$${}^O\vec{v}^O = R_{R \to O} \cdot ({}^R\vec{v}^{CO} + \omega {}^R\vec{r}^{CO})$$

When robot motion is circular, the linear velocity of the rotation center is zero and the radius from the center of rotation to the optical flow is constant in the robot frame. In this case, a single scale relates the linear velocity as measured by the optical flow sensor and angular velocity as measured at the IMU as described in the above (e.g., section related to optical flow scale estimation with gyroscope scale and known geometry) throughout the motion. If no single scale consistently relates these quantities throughout the motion, then the robot system may assume that motion is non-circular—either the center of rotation is moving, the distance from the optical flow sensor to the center of rotation is changing, or both.

Adaptations to Non-Circular Motion

The engineered patterns depicted above (e.g., in section related to repattern frequency detection on an engineered surface) are best-suited to cases where the center of rotation is fixed at the center of the pattern. While the mechanism disclosed above (e.g., in section related to image quality period detection on arbitrary surface) can be made more immune to non-circular motion, this is difficult to achieve for the frequency-detection approach.

New patterns could be developed which can identify non-circularity or even be used to reconstruct the entire device trajectory. The concept of using a grid with known spacing where surface quality changes between adjacent cells was described in, e.g., Ref. (2). A similar concept could be applied here, where locations of possible cell-crossings are assembled throughout a longer motion and used to reconstruct the most likely trajectory on an engineered surface.

An engineered pattern could also be designed that combines, for example, reflective surfaces that are placed just outside of the intended range of motion and can be used to detect drift from the pattern center.

Gyroscope Scale Calibration Via Docking Motion

Some of the mechanisms disclosed above (e.g., in section related to identification of fixed reference marks using image quality) may rely on identifying multiple known angular positions. In typical consumer applications, the robot must automatically return to a charging dock periodically and make physical contact with it in some approximate known orientation. If the heading difference between valid docked positions is bounded, then the gyroscope scale can be estimated by departing a docked position, rotating in place, and docking again. If the maximum angular difference between two docked positions is δ°, then a robot rotating n times will have a maximum gyroscope scale error $$\frac{\delta}{360n}.$$

This method has the advantage of requiring no additional infrastructure beyond what is typical for consumer robots. However, charging surfaces are typically designed to tolerate a wide range of docking positions, so δ on the order of 20 degrees are not unusual. In order to achieve 0.25% scale error with a possible alignment error of 20 degrees would require approximately 20 revolutions. In contrast, the period detection approach (e.g., the mechanism disclosed in section related to image quality period detection on arbitrary surface) obtains such a scale error over 8 revolutions ~80% of the time under typical conditions on a wood surface. Practical issues associated with the dock shifting over time (being pushed by the robot during docking or by people in the space) may introduce further errors.

SUMMARY

In various embodiments, the relationship between the motion (e.g., detected by a gyroscope) and the image quality signals (e.g., detected by an OF sensor) may be used to derive estimates of sensor calibration parameters. In some cases, the image quality information from an OF sensor may be used to estimate robot motion and thereby calibrate a gyroscope. This contrasts with the common usage of an OF sensor to measure only linear displacement.

In various embodiments, for calibrating sensors, methods and/or techniques disclosed herein may support calibration of sensors in their final installed configuration (e.g., after assembly in a final product). In an example, field re-calibration of sensors may be used to account for calibration changes that occur over time and physical aging. In another example, field re-calibration of sensors may be used to capture the effect of environmental variation on calibration, specifically adaptation of OF sensor scale to surface changes.

In one embodiment, a gyroscope scale may be calibrated by detection of a known pattern frequency in an OF image quality signal. For example, the robot system may be configured to combine several factory calibration processes on one or more final installed configuration of sensors. In another embodiment, a gyroscope scale may be calibrated by detection of periodicity in unknown OF image quality signal. For example, the robot system may be configured to or have permission to perform field re-calibration of gyroscope to account for calibration changes.

In one embodiment, a gyroscope scale may be calibrated by detection of reference marks through optical flow image quality. The robot system may be configured to or have permission to perform field re-calibration of gyroscope to account for calibration changes. In another embodiment, an optical flow distance scale may be calibrated by circular motion of a device with a calibrated gyroscope and known geometry. For example, the robot system may be configured or have permission to perform field re-calibration of the OF sensor to capture effect(s) of environmental variation(s).

Figure 19:
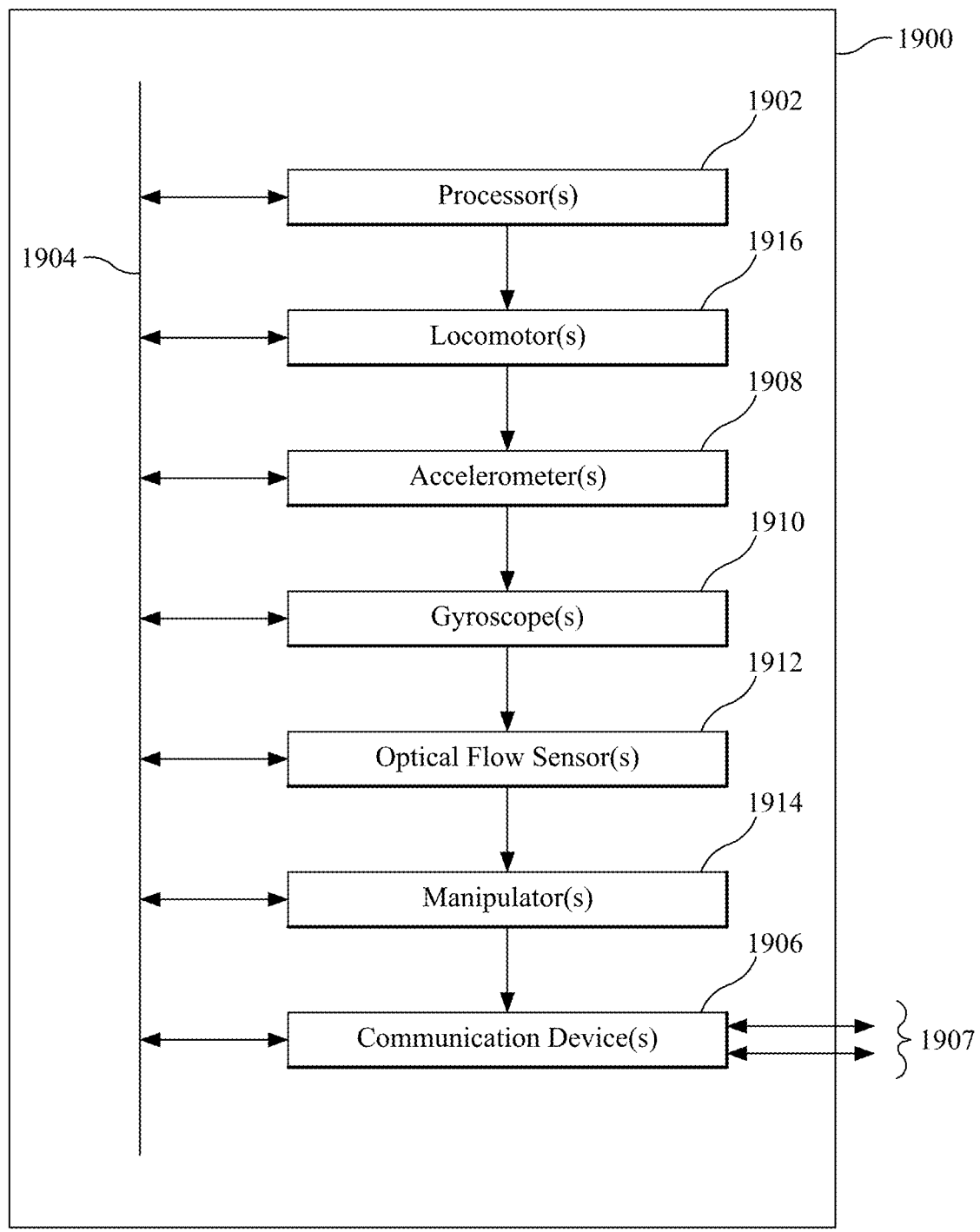
FIG. 19 is a block diagram representation of a robot which can be used in conjunction with the described embodiments.

An exemplary (but non-limiting) high level architecture of a robot 1900 is shown in FIG. 19. Therein, the robot 1900 may include, for example, one or more processors 1902 including a system bus 1904 which communicatively couples the processor(s) 1902 to: (1) one or more communication devices 1906 which enable communications with other devices via communications channels 1907, (2) one or more perceptors/sensors including one or more accelerometers 1908, one or more gyroscopes 1910, one or more optical flow sensors 1912, (3) one or more manipulators 1914, and (4) one or more locomotors 1916. The communication channels 1907 may be adaptable to both wired and wireless communication, as well as supporting various communication protocols. By way of example and not limitation, the communication channels 1907 may be configured as serial and/or parallel communication channels, such as, for example, USB, IEEE-1394, 802.11, BLE, cellular (e.g., LTE or 5G), and other wired and wireless communication protocols. If wireless communication channels are used, then the communication devices 1906 will include a wireless transceiver and antenna (not shown in FIG. 19).

The perceptors may, for example, include any number of different sensors such as: optical sensors, inertial sensors (e.g., gyroscopes, accelerometers, etc.), thermal sensors, tactile sensors, compasses, range sensors, sonar, Global Positioning System (GPS), Ground Penetrating Radar (GPR), lasers for object detection and range sensing, imaging devices, magnetometers and the like. A perceptor could also be any other existing sensor within a deployment, that would otherwise be static, but could be mounted onto a robot to get the same data distributed across a facility, instead of from a single location (e.g., temperature or humidity sensors).

Furthermore, those skilled in the art will understand that many of these sensors may include both a source and a sensor to combine sensor inputs into meaningful, actionable perceptions. For example, sonar perceptors and GPR may generate sound waves or sub-sonic waves and sense reflected waves. Similarly, perceptors including lasers may include sensors configured for detecting reflected waves from the lasers for determining interruptions or phase shifts in the laser beam. Imaging devices suitable for use as an optical flow sensor 1912 may be any suitable device for capturing images, such as, for example, an infrared imager, a video camera, a still camera, a digital camera, a Complementary Metal Oxide Semiconductor (CMOS) imaging device, a charge coupled device (CCD) imager, and the like. In addition, the imaging device may include optical devices for modifying the image to be captured, such as: lenses, collimators, filters, and mirrors. For adjusting the direction at which the imaging device is oriented, a robot 1900 may also include pan and tilt mechanisms coupled to the imaging device.

The manipulators 1914 may include, for example, vacuum devices, magnetic pickup devices, arm manipulators, scoops, grippers, camera pan and tilt manipulators, individual or coupled actuators, and the like. The locomotors 1916 may include, for example, one or more wheels, tracks, legs, rollers, propellers, and the like. For providing the locomotive power and steering capabilities, the locomotors 916 may be driven by motors, actuators, levers, relays and the like. Furthermore, perceptors may be configured in conjunction with the manipulators 1914 or locomotors 1916, such as, for example, odometers and pedometers.

The foregoing discussion of FIG. 19 and hardware associated with a typical robot was adapted from U.S. Pat. No. 8,073,564 (hereafter the '564 patent), the disclosure of which is incorporated here by reference. Those skilled in the art will appreciate, however that such elements are purely exemplary. Some robots will not include all of the elements illustrated in FIG. 19, whereas other robots may include hardware elements which do not fall into the categories depicted in FIG. 19. Nonetheless robots 1900 can include the afore-described embodiments related to scale calibration.

Conclusion

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a robot or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the sensor calibration as described above. According to other exemplary embodiments, some of the processing described above with respect to sensor calibration may be performed in the device containing the sensors, while the remainder of the processing is performed in a second device after receipt of the partially processed data from the device containing the sensors.

Although the foregoing exemplary embodiments relate to sensing signals including one or more rotational sensors and/or OF sensors, sensor calibration techniques according to these exemplary embodiments are not limited to only these types of sensors. Sensor calibration techniques as described herein can be applied to devices which include, for example, accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer, and an optical sensor (e.g., an OF sensor, a camera, one or more photodiodes, one or more phototransistors), or other sensor combinations. Additionally, although exemplary embodiments described herein relate to sensor calibration in the context of robots and robotic vacuum cleaners and applications, such techniques are not so limited and may be employed in methods and devices associated with other applications, e.g., mobile phones, medical applications, gaming, cameras, military applications, robotic devices, etc.

The above-described exemplary embodiments are intended to be illustrative in all respects, rather than restrictive, of the present invention. Thus, the present invention is capable of many variations in detailed implementation that can be derived from the description contained herein by a person skilled in the art. For example, although some of the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed:

1. A method for calibrating a gyroscope located on a robot, the method comprising:
   detecting, by the gyroscope, a physical motion of the robot operating on a surface;
   detecting, by an optical flow (OF) sensor, one or more image signals including information, wherein the OF sensor detects features of the surface;
   deriving estimates of sensor calibration parameters of each of the gyroscope and the OF sensor based on the detected physical motion of the robot and the information; and
   calibrating the gyroscope based on the information and/or the estimates of sensor calibration parameters.

2. The method of claim 1, wherein the information includes a function of a respective image at each frame of the one or more image signals.

3. The method of claim 2, wherein the function is associated with an image quality and/or image brightness.

4. The method of claim 1, wherein calibrating the gyroscope comprises:
   identifying a relationship between the information and the detected physical motion; and
   calibrating a scale parameter of the gyroscope based on the identified relationship.

5. The method of claim 1, wherein the physical motion of the robot is an in-place rotation and/or a rotation more than 360 degrees.

6. The method of claim 1, wherein the physical motion of the robot is detected on an arbitrary surface or a surface having an unknown surface pattern.

7. The method of claim 1, wherein the one or more image signals are periodic signals.

8. The method of claim 1, further comprising:
   estimating an angular motion of the robot with respect to the surface based on the information; and
   calibrating the scale of the gyroscope based on the estimated angular motion.

9. The method of claim 1, further comprising:
   relating an angular velocity to a linear velocity at the OF sensor based on a known robot geometry; and
   computing a displacement scale of the OF sensor.

10. A system to calibrate a gyroscope located on a robot, the system comprising:
    the gyroscope configured to detect a physical motion of the robot operating on a surface;
    an optical flow (OF) sensor configured to generate one or more image signals including information, wherein the OF sensor detects features of the surface; and
    a processor configured to:
    derive estimates of sensor calibration parameters of each of the gyroscope and the OF sensor based on the detected physical motion of the robot and the information; and
    calibrate the gyroscope based on the information and/or the estimates of sensor calibration parameters.

11. The system of claim 10, wherein the information includes a function of a respective image at each frame of the one or more image signals.

12. The system of claim 11, wherein the function is associated with an image quality and/or image brightness.

13. The system of claim 10, wherein the processor is further configured to calibrate the gyroscope by:
    identifying a relationship between the information and the detected physical motion; and
    calibrating a scale parameter of the gyroscope based on the identified relationship.

14. The system of claim 10, wherein the physical motion of the robot is an in-place rotation and/or a rotation more than 360 degrees.

15. The system of claim 10, wherein the physical motion of the robot is detected on an arbitrary surface or a surface having an unknown surface pattern.

16. The system of claim 10, wherein the one or more image signals are periodic signals.

17. The system of claim 10, wherein the processor is further configured to:
    estimate an angular motion of the robot with respect to the surface based on the information; and
    calibrate the scale of the gyroscope based on the estimated angular motion.

18. The system of claim 10, wherein the processor is further configured to:
  relate an angular velocity to a linear velocity at the OF sensor based on a known robot geometry; and
  compute a displacement scale of the OF sensor.

* * * * *